(12) United States Patent
Chen et al.

(10) Patent No.: US 12,105,269 B2
(45) Date of Patent: Oct. 1, 2024

(54) TELEPHOTO IMAGING SYSTEM, LENS, AND CAMERA MODULE

(71) Applicant: BEIJING XIAOMI MOBILE SOFTWARE CO., LTD., Beijing (CN)

(72) Inventors: Yonghua Chen, Beijing (CN); Yan Zheng, Beijing (CN); Zongbao Yang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 72 days.

(21) Appl. No.: 17/364,511

(22) Filed: Jun. 30, 2021

(65) Prior Publication Data
US 2022/0276473 A1    Sep. 1, 2022

(30) Foreign Application Priority Data
Feb. 26, 2021 (CN) .......................... 202110222945.8

(51) Int. Cl.
*G02B 15/14* (2006.01)
*G02B 7/09* (2021.01)
*G02B 13/00* (2006.01)

(52) U.S. Cl.
CPC ........... *G02B 15/1441* (2019.08); *G02B 7/09* (2013.01); *G02B 13/0065* (2013.01)

(58) Field of Classification Search
CPC .... G02B 15/1441; G02B 15/14; G02B 15/02; G02B 15/04; G02B 15/144113; G02B 13/18; G02B 13/001; G02B 13/002; G02B 13/0035; G02B 13/0065; G02B 3/14; G02B 7/09; G02B 26/004; G02F 1/29

USPC ....... 359/676, 684, 687, 686, 725, 728, 729, 359/739, 740, 745, 747
See application file for complete search history.

(56) References Cited

U.S. PATENT DOCUMENTS

| | | | |
|---|---|---|---|
| 2009/0141365 A1 | 6/2009 | Jannard et al. | |
| 2018/0275320 A1* | 9/2018 | Hsieh | G02B 13/18 |
| 2019/0033604 A1* | 1/2019 | Chen | G02B 27/0944 |
| 2021/0048629 A1* | 2/2021 | Kuo | G02B 26/004 |
| 2022/0066126 A1* | 3/2022 | Vinogradov | G02B 9/12 |

FOREIGN PATENT DOCUMENTS

| | | |
|---|---|---|
| CN | 101790040 A | 7/2010 |
| CN | 101988984 A | 3/2011 |
| CN | 106377220 A | 2/2017 |
| CN | 108627951 A | 10/2018 |

(Continued)

OTHER PUBLICATIONS

Extended European Search Report in Application No. 21182901.5, mailed on Dec. 17, 2021.

*Primary Examiner* — Thomas K Pham
*Assistant Examiner* — Kuei-Jen L Edenfield
(74) *Attorney, Agent, or Firm* — Syncoda LLC; Feng Ma

(57) ABSTRACT

A telephoto imaging system includes: a solid lens assembly and a tunable lens assembly. The solid lens assembly includes a first group, a second group, and a third group of solid lenses along the optical axis from the object plane to the image plane. The tunable lens assembly is configured for zooming under the effect of a driving mechanism to achieve focusing on objects at different distances. The following condition is satisfied by the tunable lens assembly when at least an in-focus state exists in the focusing process: 0<|delta (f/ft)|<0.9.

18 Claims, 13 Drawing Sheets

(56) References Cited

FOREIGN PATENT DOCUMENTS

| | | | |
|---|---|---|---|
| CN | 108732728 | A | 11/2018 |
| JP | 2011158595 | A | 8/2011 |
| KR | 100616616 | B1 | 3/2006 |
| TW | 201835627 | A | 10/2018 |
| WO | 2007024482 | A3 | 3/2007 |

\* cited by examiner

TELEPHOTO IMAGING SYSTEM, LENS, AND CAMERA MODULE

CROSS-REFERENCE TO RELATED APPLICATION

The present application claims priority to Chinese Patent Application No. 202110222945.8 filed on Feb. 26, 2021, the disclosure of which is hereby incorporated by reference in its entirety.

BACKGROUND

The camera functions of mobile phones and other electronic devices are becoming more and more diversified. With the development of imaging technologies, the camera system technology used in mobile phones and other electronic devices is updated rapidly and iteratively. For example, the multi-camera solution that has emerged in recent years has realized the application of multi-focal optical switching from ultra wide angle to telephoto shooting.

SUMMARY

The present disclosure relates generally to the field of optics, and more specifically to a telephoto imaging system, a lens, and a camera module.

According to a first aspect of embodiments of the present disclosure, a telephoto imaging system is provided, including: a solid lens assembly and a tunable lens assembly.

The solid lens assembly includes a first group of solid lenses with positive refractive power, a second group of solid lenses with negative refractive power, and a third group of solid lenses, which are arranged in order from the object plane to the image plane along the optical axis.

The tunable lens assembly is configured for zooming under the effect of a driving mechanism, so as to adjust the focal length of the telephoto imaging system to achieve focus imaging at different distances.

The tunable lens assembly satisfies the following condition when at least an in-focus state exists during the focusing process: $0<|delta(f/ft)|<0.9$, wherein f represents the focal length of the telephoto imaging system in the in-focus state, ft represents the focal length of the tunable lens assembly in the in-focus state during the focusing process, and delta(f/ft) represents the difference between the ratio of f/ft in the in-focus state and the ratio of f/ft when the infinity is in-focus.

In some embodiments, the first group of solid lenses has positive refractive power, the second group of solid lenses has negative refractive power, the first group of solid lenses includes at least one lens with a positive focal length, and the second group of solid lenses includes at least one lens with a negative focal length, wherein the distance between an image plane lens in the first group of solid lenses and an object plane lens in the second group of solid lenses is the largest distance between any lenses in the first and second group of solid lenses.

In some embodiments, the maximum value of the FOV change of the telephoto imaging system during the focusing process satisfies the following condition: $|Delta(FOV)|<1.5°$.

In some embodiments, in the telephoto imaging system, the focal length f1 of the first group of solid lenses and the focal length f2 of the second group of solid lenses satisfy the following condition: $0.3<|f2/f1|<2.0$.

In some embodiments, the focal length f of the telephoto imaging system when the infinite is in-focus and the focal length f3 of the third group of solid lenses satisfy the following condition: $0<|f/f3|<1.5$.

In some embodiments, let the lens closest to the object plane in the first group of solid lenses is a first lens, the focal length f of the telephoto imaging system when the infinity is in-focus, and the distance TTL between the vertex on a surface of the first lens and the imaging plane along the optical axis satisfy the following condition: $0.8<TTL/f<1.2$.

In some embodiments, the first lens closest to the object plane in the first group of solid lenses is a positive lens, the surface of the first lens facing the object plane is a convex surface, the radius of curvature of the surface of the first lens facing the object plane is R1, and the radius of curvature of the surface of the first lens facing the image plane is R2, wherein $-1.5<(R1+R2)/(R1-R2)<0$.

In some embodiments, the surface facing the image plane of the negative lens in the second group of solid lenses is concave and aspheric.

In some embodiments, on the imaging plane, an angle CRA is formed between the central light ray corresponding to the highest imaging point and the normal line of the imaging plane, wherein CRA is less than 30°.

In some embodiments, on the imaging plane, the optical distortion value DIST at the highest imaging point satisfies the following condition: $|DIST|<5\%$.

In some embodiments, the Abbe number or dispersion coefficient of the material used for at least one lens with positive refractive power in the first group of solid lenses is larger than 50, and the Abbe number or dispersion coefficient of the material used for at least one lens with negative refractive power in the second group of solid lenses is less than 30.

In some embodiments, at least one lens in the first group of solid lenses and the second group of solid lenses is a plastic lens, and the refractive index of the plastic lens is less than 1.7.

In some embodiments, the tunable lens assembly is arranged between the first group of solid lenses and the image plane along the optical axis.

In some embodiments, the tunable lens assembly is arranged between the first group of solid lenses and the object plane along the optical axis.

According to a second aspect of embodiments of the present disclosure, a lens is provided, including an aperture and telephoto imaging system described in any one of the above embodiments.

The aperture is arranged between the first group of solid lenses and the image plane along the optical axis, the tunable lens assembly is arranged on either side of the aperture along the optical axis, and when the infinity is in-focus, the distance d between the vertex on a surface of the tunable lens assembly facing the aperture and the aperture satisfies the following condition: $d/TTL<0.5$, wherein TTL is the distance between the vertex on the surface close to the object plane of the lens closest to the object plane in the first group of solid lenses and the imaging plane along the optical axis.

According to a third aspect of embodiments of the present disclosure, a lens is provided, including a deflecting prism, an aperture, and the telephoto imaging system described in any one of the foregoing embodiments.

The deflecting prism is arranged on the object plane of the first group of solid lenses along the optical axis, or between the third group of solid lenses and the image plane.

According to a fourth aspect of embodiments of the present disclosure, a camera module is provided, including a photosensitive chip, a driving mechanism, and the telephoto imaging system of any one of the above embodiments, wherein the driving mechanism is used to change the curature of the tunable lens assembly according to a control signal.

According to a fifth aspect of embodiments of the present disclosure, an electronic device is provided, which includes a processor and the aforementioned camera module, wherein the processor is electrically connected to a driving mechanism and is used to send the control signal.

It should be understood that the above general description and the following detailed description are only exemplary and explanatory, and cannot limit the present disclosure.

BRIEF DESCRIPTION OF THE DRAWINGS

The drawings here are incorporated into the present specification and constitute a part of the present disclosure, show embodiments in accordance with the present disclosure, and are used together with the present specification to explain the principle of the present disclosure.

DETAILED DESCRIPTION

Figure 1:
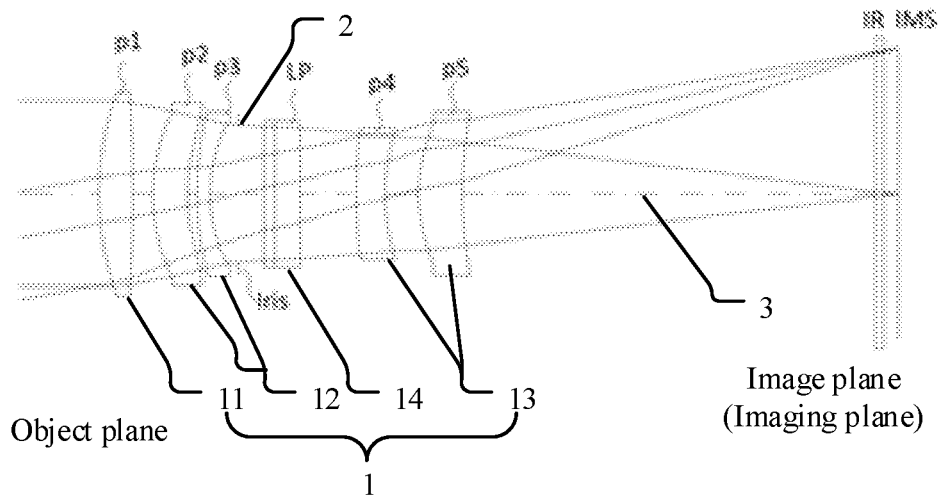
FIG. 1 is a schematic structure diagram showing a lens according to an exemplary embodiment.

A detailed description of the following specific exemplary embodiments will be provided, and examples thereof will be shown in the accompanying drawings. The following description refers to the drawings. Unless otherwise indicated, the same numbers in different drawings indicate the same or similar elements. The implementation manners described in the following exemplary embodiments do not represent all implementation manners consistent with the present disclosure. On the contrary, they are merely examples of devices and methods consistent with some aspects of the present disclosure as detailed in the appended claims.

Limited by the overall size of electronic devices such as mobile phones, camera systems tend to be compact and miniaturized. On the premise of ensuring a miniaturized structure, how to improve multi-focal optical imaging, especially to in telephoto shooting, and to expand the focus range of the camera system, while still ensuring good imaging quality, is a challenge with electronic devices.

To achieve the focus imaging of the lens, a driving structure is usually used to drive single or multiple groups of lenses to move along the optical axis. Air gaps may need to be reserved for the camera system, which increases the complexity of the structure and the overall size, rendering it difficult to achieve the best miniaturized structure.

Miniature telephoto lenses used in mobile phones and other electronic devices generally perform the focusing process by moving the entire group of lenses along the optical axis. During the focusing process, the total length of the lens increases continuously. Especially for close-range imaging, the overall length of travel is large, and the length of the lens is also large, which is not conducive to module miniaturization. In addition, this focusing method also has problems such as a large change in the Field of View (FOV) when focusing from infinity to close-range (breathing effect), which is disadvantageous to the image presentation of video shots.

Various embodiments of the present disclosure provide a telephoto imaging system, including: a solid lens assembly and a tunable lens assembly. The solid lens assembly includes a first group of solid lenses with positive refractive power, a second group of solid lenses with negative refractive power, and a third group of solid lenses, which are arranged in order along the optical axis from the object plane to the image plane. The tunable lens assembly is configured for zooming under the effect of a driving mechanism to adjust the focal length of the telephoto imaging system. The tunable lens assembly satisfies the following condition when at least an in-focus state exists during the focusing process: 0<|delta(f/ft)|<0.9, wherein f represents the focal length of the telephoto imaging system in the in-focus state, ft represents the focal length of the tunable lens assembly in the in-focus state during the focusing process, and delta(f/ft) represents the difference between the f/ft ratio in the in-focus state, and the f/ft ratio when the infinity is in focus. The telephoto imaging system in the present disclosure uses the focal length change of the tunable lens assembly to achieve focusing, and the solid lens does not need to be moved. Therefore, there is no need to reserve moving space in the telephoto imaging system, which facilitates the miniaturization design of the telephoto imaging system. On the optical axis, the tunable lens assembly is located between the groups of solid lenses, ensuring the focus range while reducing sensitivity. At the same time, the focal length change of the tunable lens assembly can meet the needs for different focusing distance ranges, which is beneficial to meet the needs of different products, expand the range of imaging distances, and ensure imaging quality.

In an exemplary embodiment, a telephoto imaging system 1 is provided, as shown in FIG. 1, including: a solid lens assembly and a tunable lens assembly 14. The solid lens assembly includes a first group of solid lenses 11, a second group of solid lenses 12, and a third group of solid lenses 13, which are arranged in order from the object plane to the image plane along the optical axis 3.

In this embodiment, the tunable lens assembly 14 is used as the focusing assembly, and the focal length of the overall imaging system is changed, so as to replace the focusing method in the related art, where the overall lens moves along the optical axis. There is no need to reserve a moving space for the lens. During the focusing process, the imaging system's full length is fixed, effectively reducing the overall structure size.

Specifically, the tunable lens assembly (LP) 14 is arranged between the first group of solid lenses 11 and the image plane along the optical axis, or the tunable lens assembly 14 is arranged between the first group of solid lenses 11 and the object plane along the optical axis. The tunable lens assembly 14 is configured for zooming under the effect of the driving mechanism to adjust the focal length of the telephoto imaging system. There is a greater degree of freedom for the position of the tunable lens assembly 14, so as to ensure that the tunable lens assembly 14 is located in the middle and rear sections of the entire telephoto imaging system, which is beneficial to reduce sensitivity and reduce imaging quality degradation during focusing. In the adjustment process of focal length, the focal length range of the tunable lens assembly 14 can be flexibly adjusted to meet the requirements of different distance imaging ranges. At the same time, the full length of the telephoto imaging system 1 remains fixed during the focusing process, which avoids imaging quality deterioration caused by the eccentricity of the optical axis during the moving process.

In the above embodiment, the structure of the tunable lens assembly 14 may be implemented in multiple ways. For example, it may be a liquid crystal lens assembly or a lens assembly containing a liquid fluid structure.

In an example, the liquid crystal lens may apply an electric field to a liquid crystal layer sandwiched between a pair of transparent substrates, so that the alignment state of the liquid crystal molecules is changed, thereby changing the focal length.

Figure 2:
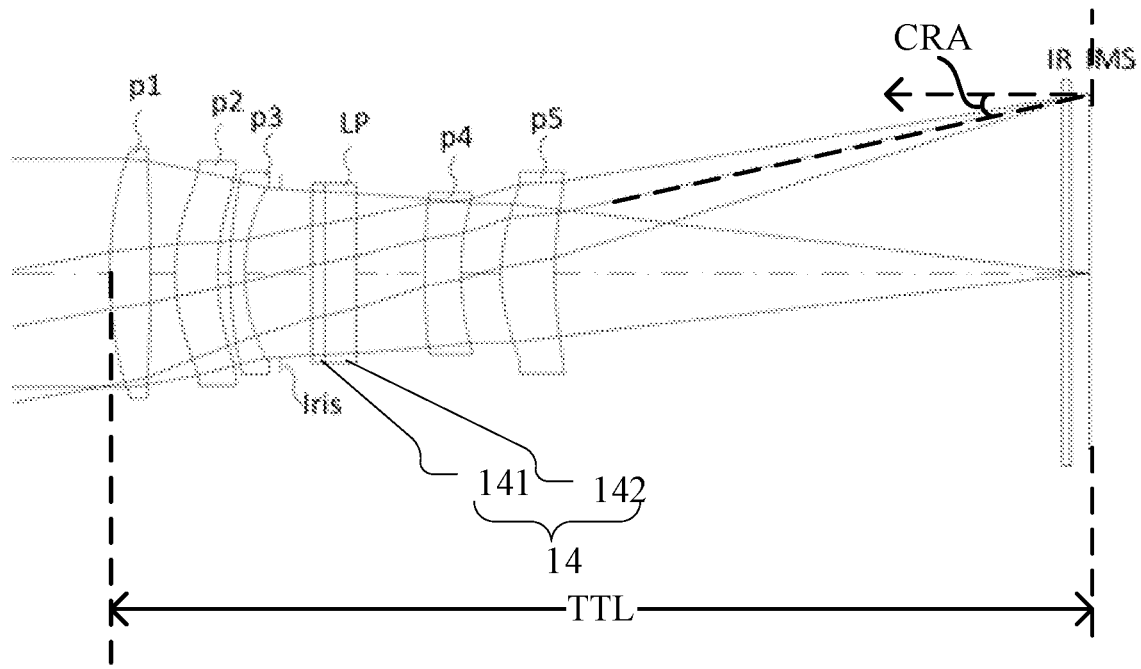
FIG. 2 is a schematic structure diagram showing a lens according to an exemplary embodiment 1.

In another example, the liquid structure lens may adopt a structure in which a film is used to wrap a polymer or a liquid component of water and oil. As shown in FIG. 2, the tunable lens assembly (LP) 14 includes a base sheet 141 and a liquid structure part 142, wherein the base sheet 141 mainly acts as a support.

In this example, the film of the liquid structure lens can change its curvature under the squeezing effect of the driving mechanism, thereby changing the focal length. The driving mechanism can be a voice coil motor (VCM), a piezoelectric motor, etc. The focal length of the liquid lens has a large range of change, which can flexibly meet the needs of different imaging distances.

Still referring to FIG. 1, during the focusing process of the tunable lens assembly, there is at least one in-focus state, wherein the following condition is satisfied: $0<|\text{delta}(f/ft)|<0.9$, where f represents the focal length of the telephoto imaging system in the in-focus state, ft represents the focal length of the tunable lens assembly in the in-focus state during the focusing process, and delta (f/ft) represents the distance between the corresponding f/ft ratio in the in-focus state and the corresponding f/ft ratio when the infinity is in-focus. In the above description, the in-focus state means that the telephoto imaging system is in an in-focus state, and a specific in-focus state may be, for example, the in-focus state with a specific object distance.

In an embodiment, using the matching structure of the solid lens and the tunable lens assembly 14, the miniaturization of the imaging system and the effect of reducing the travel for focusing can be achieved. At the same time, by limiting the focal length of the tunable lens assembly 14, the object distance range for focusing that the product needs to achieve is satisfied, so as to achieve the automatic focusing function of the imaging system. This is conducive to expanding the imaging distance range under the premise of miniaturization, and reducing the change of the Field of View, so that the picture to be shot is clearly presented on the imaging plane, and the imaging quality is further improved.

In an exemplary embodiment, still referring to FIG. 1, the first group of solid lenses has positive refractive power, the second group of solid lenses has negative refractive power, the first group of solid lenses 11 includes at least one lens with a positive focal length, and the first group of solid lenses 12 include at least one lens with a negative focal length.

In this embodiment, by rationally configuring the refractive power and structure of each solid lens lens, the sensitivity of each group of lenses is reduced, which further ensures that the telephoto imaging system achieves good imaging quality. For example, the first group of solid lenses 11 may be a lens group with relatively large positive refractive power, and the second group of solid lenses 12 may be a lens group with relatively large negative refractive power. The positive and negative lenses in the first group of solid lenses 11 and the second group of solid lenses 12 are matched to realize beam contraction, reduce spherical aberration, and realize chromatic aberration compensation.

In the above description, the surface of the negative lens (ie, concave lens) included in the second group of solid lenses 12 facing the image plane is a concave surface and an aspheric surface.

In an embodiment, the third group of solid lenses 13 may be a lens group with relatively weak positive refractive power. Specifically, the third group of solid lenses 13 further includes at least one lens with a concave shape facing the image plane. This effectively realizes the compensation in distortion and curvature of field.

In an exemplary embodiment, the maximum value of the FOV change of the telephoto imaging system 1 during the focusing process satisfies the following condition: |Delta (FOV)|<1.5°. In this embodiment, the focusing control is performed by the tunable lens assembly, which reduces the change in the FOV during the focusing process, and further ensures the imaging quality.

In an exemplary embodiment, still referring to FIG. 1, the focal length f1 of the first group of solid lenses 11 and the focal length f2 of the second group of solid lenses 12 in the telephoto imaging system 1 satisfy the following condition: $0.3<|f2/f1|<2.0$. This helps to meet the requirements in the refractive power of the first group of solid lenses 11 and the second group of solid lenses 12, such that the telephoto shooting effect is achieved while taking into account the compensation effect in the spherical aberration and the workability.

When $|f2/f1|$ is greater than 2.0, that is, exceeds the upper limit of the range in the above embodiment, it indicates that the refractive power of the first group of solid lenses 11 is too large, and the refractive power of the second group of solid lenses 12 is too small, resulting in excessive spherical aberration.

When $|f2/f1|$ is less than 0.3, that is, less than the lower limit of the range in the above embodiment, the refractive power of the second group of solid lenses 12 is too large, and the light emitted by the second group of solid lenses 12 is divergent light. The refractive power of the third group of solid lenses 13 will also be too large, resulting in insufficient compensation of chromatic aberration, and an increased overall length of the telephoto imaging system, rendering it impossible to achieve the miniaturization of the module.

In an embodiment, the range of f2/f1 can satisfy, for example, the following condition: $0.5<|f2/f1|<1.8$. This further keeps the refractive power of the first group of solid lenses 11 and the second group of solid lenses 12 to be appropriate, and avoids excessive spherical aberration. Thus, sufficient compensation in chromatic aberration can be ensured, and the overall performance of the telephoto imaging system is improved.

In an exemplary embodiment, still referring to FIG. 1, the focal length f of the telephoto imaging system when the infinite is in focus and the focal length f3 of the third group of solid lenses 13 satisfy: $0<|f/f3|<1.5$. This condition defines the ratio of refractive power between the third group of solid lenses and the imaging system as a whole. When $|f/f3|$ is greater than 2.1, the refractive power of the third group of solid lenses is too large, and the refractive power is mainly concentrated in the rear group, while the refractive power of the front group is weak, resulting in an increased total length. When $|f/f3|$ is less than 0.1, the refractive power of the third group of solid lenses is small, and the compensation for field curvature and distortion at the edge Field of View is insufficient. In this embodiment, f/f3 may further satisfy $0.1<|f/f3|<1.2$, for example.

In an exemplary embodiment, as shown in FIG. 1 to FIG. 2, let the lens closest to the object plane in the first group of solid lenses 11 is the first lens, the focal length f of the telephoto imaging system when the infinity is in focus, and the distance TTL (total track length) between the vertex on a surface close to the object surface of the first lens and the imaging plane along the optical axis 3, satisfy the following condition: $0.8<TTL/f<1.2$, wherein f is the focal length of the telephoto imaging system when focusing at infinity.

As shown in FIG. 2, the lens closest to the object plane in the first group of solid lenses 11 is the first lens (P1), and the distance from the vertex on the surface of the first lens closest to the object plane to the imaging plane along the optical axis is TTL. When the TTL/f ratio exceeds the upper limit and is greater than 1.2, the overall length of the telephoto imaging system is too long, and the occupied volume increases, which is not conducive to the module miniaturization. When the TTL/f ratio is less than the lower limit of 0.8, compared to the focal length, the overall length of the telephoto imaging system is short, and the refractive power of each group is too large. This results in that the spherical aberration and chromatic aberration cannot be fully compensated, the optical performance is reduced, and it is difficult to achieve relatively high imaging resolution.

In an exemplary embodiment, referring to FIG. 1, the first group of solid lenses has positive refractive power, the second group of solid lenses has negative refractive power, and the first lens near the object plane in the first group of solid lenses 11 is a positive lens. The first group of solid lenses 11 includes a lens P1, and the second group of solid lenses 12 includes lenses P2 and P3. The distance between the image plane lens in the first group of solid lenses and the object plane lens in the second group of solid lenses is the largest distance between any lenses in the first and second group of solid lenses. The third group of solid lenses 13 includes P4 and P5, wherein, the first lens is lens P1.

In an embodiment, the surface of the first lens facing the object plane is convex, and its radius of curvature is denoted as R1. The radius of curvature of the surface of the first lens (P1) facing the image plane is R2, where $-1.5<(R1+R2)/(R1-R2)<0$. This formula defines the shape relationship of the first lens. The radius of curvature of the R1 surface is always smaller than the radius of curvature of the R2 surface, which is beneficial to shorten the overall length of the telephoto imaging system and better meet the needs of miniaturized camera modules. When the formula is close to the lower limit, the radiuses of curvature of the R1 and R2 surfaces are both small, the refractive power is large, and the resulting spherical aberration is not conducive to the improvement of optical performance. When the formula is close to the upper limit, the radius of curvature of the R1 surface is too large, and the refractive power of the first lens is weak, which is not conducive to shortening the total length.

In an embodiment, R1 and R2 may, for example, further satisfy: $-1.0<(R1+R2)/(R1-R2)<0$, which can further shorten the overall length of the telephoto imaging system while ensuring the imaging effect.

In an exemplary embodiment, as shown in FIGS. 1 to 2, on the imaging plane, the angle between the central light ray corresponding to the highest imaging point and the normal line of the imaging plane is called Chief Ray Angle (CRA), where CRA<30°.

As shown in FIG. 2, the highest imaging point is the maximum image height of the image in the figure, which is the maximum effective imaging height, or the radius value of the effective imaging circle. The light corresponding to the highest imaging point is as shown in the figure, wherein when the central light ray is incident on the image plane, the included angle with the normal line of the image plane is CRA. In an embodiment, the telephoto imaging system is specifically a telephoto imaging system suitable for medium telephoto, and CRA is compatible with Field of View (FOV). The FOV is smaller, and the CRA is also smaller.

In an embodiment, on the imaging plane, the optical distortion value at the highest imaging point is DIST, which satisfies the following condition: $|DIST|<5\%$.

In an exemplary embodiment, referring still to FIG. 1, the Abbe number or dispersion efficiency of the material used for at least one lens with positive focal length in the first group of solid lenses 11 is larger than 50. The Abbe number or dispersion efficiency of the material used for at least one lens with negative focal length in the second group of solid lenses 12 is less than 30. The Abbe numbers or dispersion efficiencies of the first group of solid lens 11 and the second group of solid lenses 12 are matched to better realize chromatic aberration compensation.

In an embodiment, the convex lens in the first group of solid lenses 11 can be made of, for example, a low-dispersion material, and the Abbe number is greater than 50. For example, the concave lens in the second group of solid lenses 12 may be made of a high-dispersion material, and the Abbe number is less than 30.

In an exemplary embodiment, still referring to FIG. 1, at least one of the first group of solid lenses 11 and the second group of solid lenses 12 is a plastic lens, and the refractive index of the plastic lens is less than 1.7.

In an embodiment, the solid lens in each group of solid lenses can be formed of glass or plastic according to actual needs. At least one solid lens in the telephoto imaging system in an embodiment is made of plastic material, which facilitates the use of higher-order aspheric coefficients, shortens the overall length while effectively compensating for aberrations, and is easy to achieve lightweight and low-cost lenses.

In the lenses of each group of solid lenses, at least one of the first surface and the second surface of the lens may be aspherical. The shape of the aspheric surface can be expressed by the following equation:

$$Z = \frac{cY^2}{1+\sqrt{1-(1+K)c^2Y^2}} + AY^4 + BY^6 + CY^8 + DY^{10} + EY^{12} + FY^{14},$$

where c is the curvature at the vertex of the lens (the reciprocal of the radius of curvature), K is the conic constant, and Y is the distance from a certain point on the aspheric surface of the lens to the optical axis along the direction perpendicular to the optical axis. In addition, the constants A to F represent aspheric coefficients, K represents cone coefficient in the aspheric curve equation, A represents fourth-order aspheric coefficient, B represents sixth-order aspheric coefficient, C represents eighth-order aspheric coefficient, D represents ten-order aspheric coefficients, E represents twelfth-order aspheric coefficients, and so on. Z is the distance between a certain point on the aspheric surface at the distance Y and a tangent plane passing through the vertex on the aspheric surface of the lens.

In an exemplary embodiment, the present disclosure also proposes a lens, as shown in FIG. 1, including: a telephoto imaging system 1 and an aperture 2. The aperture 2 is arranged between the first group of solid lenses 11 and the image plane along the optical axis 3. The aperture 2 and the tunable lens assembly 14 are set corresponding to each other, so as to facilitate adjustment of the aperture of the tunable lens assembly 14. The position at which the light passes therethrough in the tunable lens 14 is as close as possible to the central part of the tunable lens assembly 14, so as to ensure a clear image. The distance d from the vertex on the surface of the tunable lens facing the aperture to the aperture satisfies the following condition: d/TTL<0.5.

In an embodiment, the tunable lens assembly 14 is arranged on either side of the aperture 2 along the optical axis 3, and the distance between the tunable lens assembly 14 and the aperture 2 meets a preset interval. Specifically, the tunable lens 14 is adapted to the aperture 2 in position. For example, it means that the aperture 2 is arranged near the tunable lens assembly 14.

In an example, the tunable lens assembly 14 is located upstream (left side) of the aperture 2 on the optical axis 3, that is, between the aperture 2 and the object plane. In another example, the tunable lens assembly 14 is located downstream (right side) of the aperture 2 on the optical axis 3, that is, on the side of the aperture 2 away from the object plane. The position at which light passes therethrough in the tunable lens assembly is as close as possible to the central part of the tunable lens assembly, further ensuring clear imaging.

In an example, the aperture 2 and the tunable lens assembly 14 are disposed between the first group of solid lenses 11 and the second group of solid lenses 12, for example. In another example, the aperture 2 and the tunable lens assembly 14 are disposed between the second group of solid lenses 12 and the third group of solid lenses 13, for example. In another example, the aperture 2 and the tunable lens assembly 14 are arranged between the third group of solid lenses 13 and the image plane.

In an embodiment, as shown in FIG. 1, the aperture 2 is located between the second group of solid lenses 12 and the third group of solid lenses 13, and the tunable lens assembly 14 is located on a side of the aperture 2 near the third group of solid lenses 13. That is, the aperture 2 and the tunable lens assembly 14 are sequentially arranged between the second group of solid lenses 12 and the third group of solid lenses 13, so as to realize focusing of the telephoto imaging system from infinity to close-distance.

Specifically, the clear aperture of the first group of solid lenses 11 is the largest part of the entire telephoto imaging system. In order to ensure that the tunable lens assembly 14 has a smaller aperture, the tunable lens assembly 14 can be arranged upstream or downstream of the second group of solid lenses 12, thereby reducing the aperture of the tunable lens assembly 14, and at the same time rendering the position, at which the center light of each Field of View passes therethrough, in the tunable lens assembly 14 is as close as possible to the central part of the tunable lens assembly 14.

The above-mentioned aperture can be a fixed aperture or a variable aperture with a multi-level change in aperture controlled by an electrical signal in a module implementation.

In an exemplary embodiment, a deflecting prism assembly may be provided on the object plane of the first group of solid lenses or the image plane of the third group of solid lenses, so as to realize optical path folding, to reduce the thickness of the module, and to adapt to size restrictions of other electronic devices such as mobile phones. At this time, the lenses in the group of solid lenses may be circular or non-circular.

In one example, the deflecting prism assembly is arranged on the object plane of the first group of solid lenses.

In another example, the first deflecting prism assembly is arranged on the object plane of the first group of solid lenses and the second deflecting prism is arranged between the third group of solid lenses and the image sensor.

In addition, in the module realization of the optical imaging system in the above embodiment, a lens barrel mechanical part is also provided, so as to fix the solid lens or the tunable lens assembly. The mechanical parts of the lens barrel can be formed of plastic, which shrinks or expands according to the temperature change of the surrounding environment, thus changing the distance between the lenses. In various embodiments, by simulating the overall temperature change characteristics, materials used for the group of solid lenses and the mechanical parts of the lens barrel are reasonably selected, so that the focal position changes caused by the temperature change under the cooperation of the tunable lens assembly, the group of solid lenses and the mechanical parts of the lens barrel are thesmallest.

To further describe the lens structure of the present disclosure, several specific embodiments will be listed below.

Embodiment 1

With reference to FIG. 1 or 2, the lens structure, along the optical axis 3 from the object plane to the image plane, sequentially includes: a first group of solid lenses 11, a second group of solid lenses 12, an aperture 2, a tunable lens assembly 14, a third group of solid lenses 13, a filter IR and an image sensor IMS.

In the above embodiment, there are 5 solid lenses. That is to say, the first group of solid lenses 11 includes lens P1 (the first lens); the second group of solid lenses 12 includes lens P2 and lens P3; and the third group of solid lenses 13 includes lens P4 and lens P5.

In an embodiment, the lens p1 with positive refractive power has a convex surface facing the object plane, the lens p2 with positive refractive power is convex facing the object plane, the lens p3 with negative refractive power is concave facing the image plane, and the surface of the lens P3 facing the image plane is aspherical. The lens p4 has negative refractive power, and the lens p5 with positive refractive power has a convex surface facing the object plane. Specifically, each lens is formed of plastic with different optical characteristics, and each lens is an aspheric lens.

Figure 3:
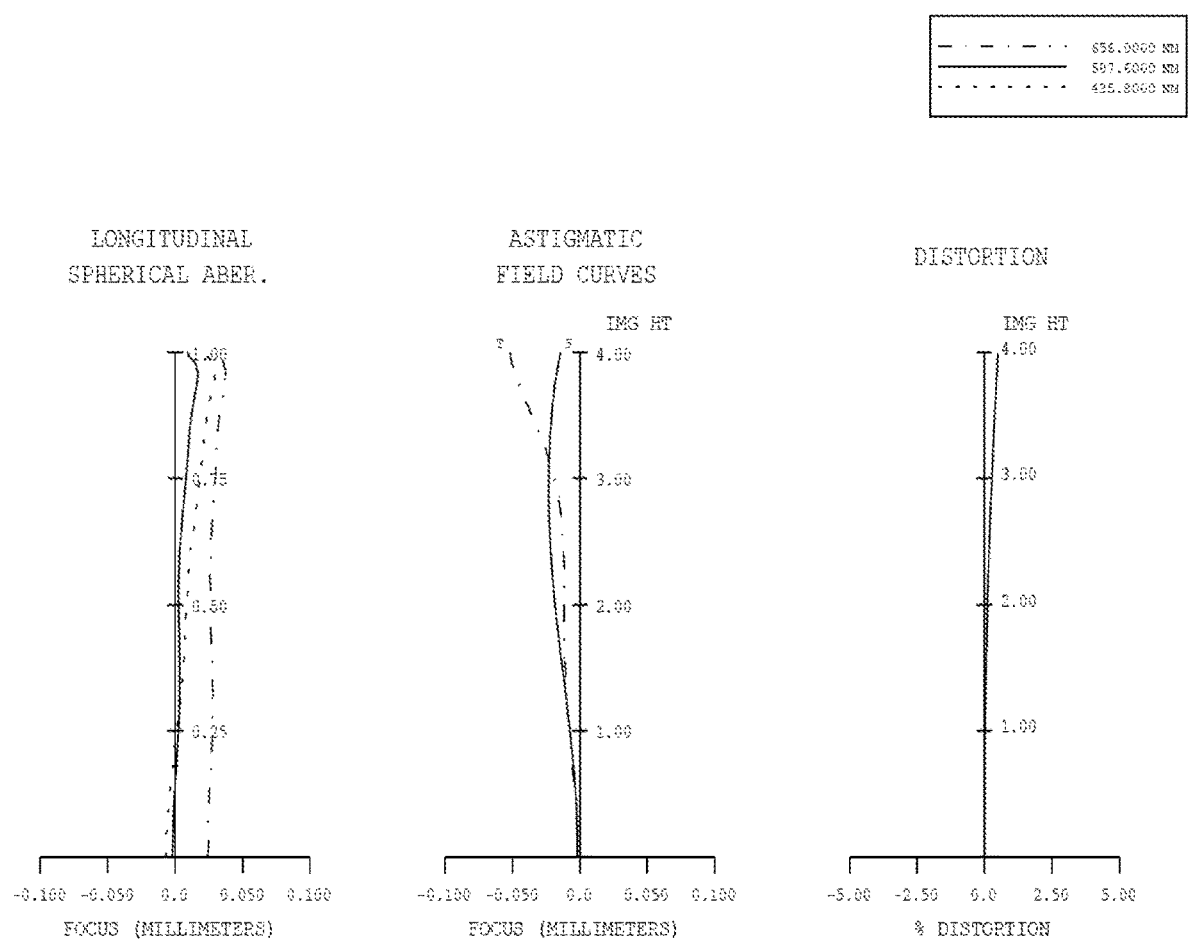
FIG. 3 is an aberration diagram according to an exemplary embodiment 1.
Figure 4:
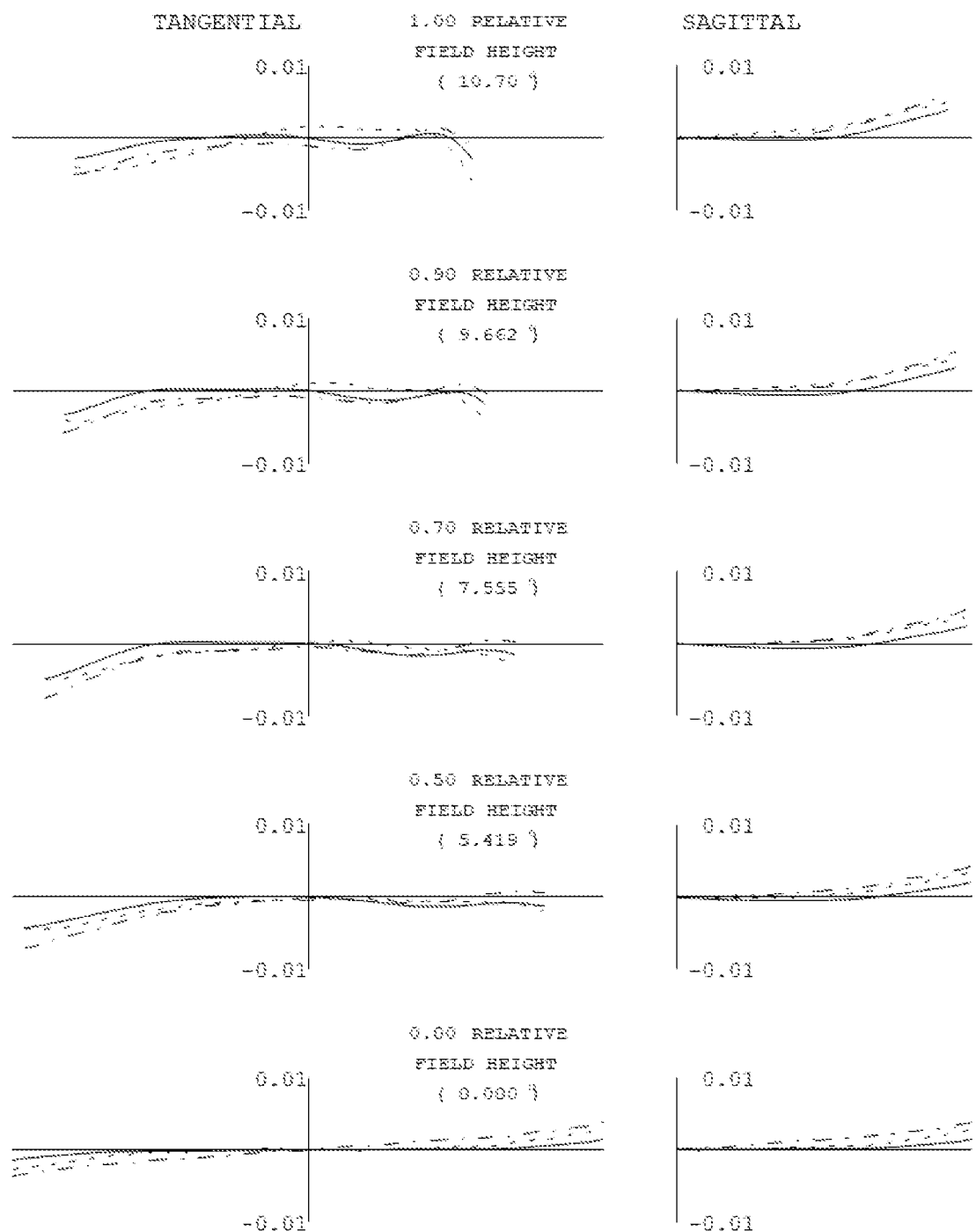
FIG. 4 is another aberration diagram according to an exemplary embodiment 1.

Refer to Table 1-1 to Table 1-3 for the parameters of the lens structure in this embodiment. FIGS. 3 to 4 show the aberration diagrams of the lens structure. In FIG. 3, from left to right, there are sequentially diagrams of longitudinal spherical aberration, astigmatic field curves, and distortion curves for the lens structure. FIG. 4 shows the lateral chromatic aberration or vertical chromatic aberration of the lens structure. It can be seen from FIGS. 3 and 4 that the lens structure according to this embodiment has better imaging performance, and spherical aberration, curvature of field, and distortion are all falling within an appropriate range.

Table 1-1 is a description of the characteristics of each lens according to embodiment 1. The meaning of each letter is as follows.

S represents surface number, symbol * represents aspherical surface, R represents radius of curvature, thi represents lens thickness, Nd represents refractive index, Vd represents Abbe number (dispersion characteristic), EFL represents the actual effective focal length of the lens, OBJ represents object plane, STO represents aperture, and IM represents imaging plane.

Specifically, in the S column, 1* represents the surface of lens P1 close to the object plane, and 2* represents the surface of lens P1 away from the object plane. Similarly, 3* and 4* represent the two surfaces of lens P2, 5* and 6* represent the two surfaces of lens P3, 11* and 12* represent the two surfaces of lens P4, and 13* and 14* represent the two surfaces of lens P5. 8, 9, and 10 correspond to surfaces of the tunable lens assembly structure.

TABLE 1-1

| S | R | thi | Nd | Vd | EFL |
|---|---|---|---|---|---|
| OBJ |  | D0 |  |  |  |
| 1* | 13.922 | 0.89 | 1.54 | 55.97 | 17.35 |
| 2* | −28.651 | 0.54 |  |  |  |
| 3* | 4.223 | 0.94 | 1.54 | 55.97 | 26.22 |
| 4* | 5.528 | 0.15 |  |  |  |
| 5* | 7.841 | 0.32 | 1.58 | 28.23 | −12.70 |
| 6* | 3.754 | 0.90 |  |  |  |
| STO | INF | 0.70 |  |  |  |
| 8 | INF | 0.28 | 1.52 | 64.20 |  |
| 9 | INF | 0.70 | 1.29 | 108.63 |  |
| 10 | Rt | 1.50 |  |  |  |
| 11* | 29.497 | 0.80 | 1.63 | 23.31 | −14.46 |
| 12* | 6.911 | 0.88 |  |  |  |
| 13* | 3.133 | 0.93 | 1.58 | 28.23 | 11.35 |
| 14* | 5.291 | 11.49 |  |  |  |
| 15 | INF | 0.21 | 1.517 | 64.2 |  |
| IM | INF | 0.42 |  |  |  |

Table 1-2 is the description of the aspheric coefficients of each lens surface. The meaning of each letter is as follows.

Surface stands for the same meaning as S, i.e., surface number, which is similar to Table 1. 1 to 6 in the surface column respectively represent each surface of lenses P1 to P3, and 11 to 14 respectively represent: each surface of lenses P4 to P5.

K, A, B, C, D, and E are all aspheric coefficients, as defined in the aforementioned aspheric formula, wherein K represents the cone coefficient in the aspheric curve equation, A represents the fourth-order aspheric coefficients, B represents the sixth-order aspheric coefficients, C represents the eighth-order aspheric coefficients, D represents the tenth-order aspheric coefficients, and E represents the twelfth-order aspheric coefficients.

TABLE 1-2

| surface | K | A | B | C | D | E |
|---|---|---|---|---|---|---|
| 1 | −2.85294E−01 | −7.24203E−04 | 1.18522E−04 | −1.31900E−06 | 2.55932E−07 | 0.00000E+00 |
| 2 | −1.00000E+01 | −7.94489E−04 | 1.14301E−04 | 3.92262E−06 | −2.69135E−07 | 0.00000E+00 |
| 3 | 0.00000E+00 | −3.48682E−04 | −3.99340E−04 | −4.36859E−05 | −3.38564E−06 | 0.00000E+00 |
| 4 | −1.48401E−01 | −6.17084E−04 | −4.65499E−04 | −1.29302E−04 | 6.87711E−06 | 0.00000E+00 |
| 5 | 1.57420E−01 | 1.97633E−04 | 3.39883E−04 | 1.75246E−05 | −6.98734E−06 | 0.00000E+00 |
| 6 | −4.69245E−02 | 1.61133E−03 | 8.31218E−05 | 7.91516E−05 | −1.24236E−05 | 0.00000E+00 |
| 11 | −9.72406E+00 | 6.48535E−03 | 1.44295E−04 | 3.31102E−07 | −7.14538E−06 | 0.00000E+00 |
| 12 | 0.00000E+00 | −6.77739E−03 | 2.77134E−03 | −3.03770E−04 | 1.00566E−05 | 0.00000E+00 |
| 13 | −3.43920E+00 | −5.24688E−03 | 6.52443E−05 | 5.83404E−05 | −5.00222E−06 | 0.00000E+00 |
| 14 | −6.72650E+00 | −2.11947E−03 | −7.06435E−04 | 1.21057E−04 | 2.96274E−06 | −2.53235E−06 |

Table 1-3 is the parameter description of embodiment 1, and the meaning of each letter is as follows.

DO stands for different in-focus object distances, that is, the distance along the optical axis between the in-focus object plane and the object vertex of the first group of solid lenses. INF repressents infinity, Pos1 represents the parameter when focusing at infinity, and Pos2 represents the parameter when focusing at close-range (the distance corresponding to close-range in the table is 350 mm). Fno represents the aperture value, f represents the focal length of the lens structure or telephoto imaging system when the corresponding object distance is in focus, and ft represents the focal length state of the tunable lens assembly when the corresponding object distance is in focus.

TABLE 1-3

|  | Pos1 | Pos2 |
|---|---|---|
| D0 | INF | 328 |
| Rt | INF | −51.46 |
| Fno | 4.12 | 4.13 |
| f | 21.04 | 19.47 |
| ft | INF | 176.33 |

Embodiment 2

Figure 5:
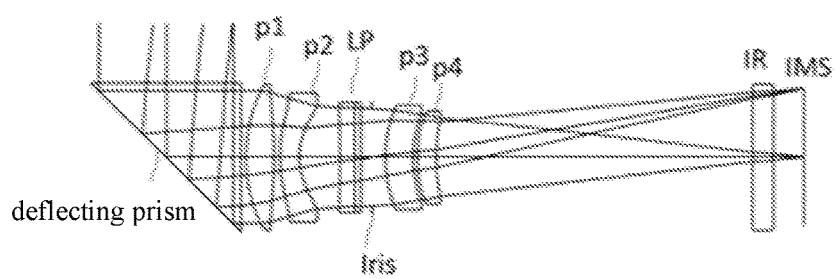
FIG. 5 is a schematic structure diagram showing a lens according to an exemplary embodiment 2.

As shown in FIG. 5, the lens structure along the optical axis from the object plane to the image plane sequentially comprises: a deflecting prism, lens P1 in the first group of solid lenses, lens P2 in the second group of solid lenses, a tunable lens assembly (LP), an Iris, lens P3 and lens P4 in the third group of solid lenses, and a filter IR and an image sensor IMS. In the above case, there are a total of 4 solid lenses.

In an embodiment, the lens p1 with positive refractive power has a convex surface facing the object plane. The lens p2 with negative refractive power has a concave surface facing the image plane. The lens p3 has negative refractive power. The lens p4 with positive refractive power has a convex surface facing the object plane. Specifically, each lens is formed of plastic materials with different optical characteristics, and each lens is an aspheric lens.

The parameters of the lens structure in this embodiment can be seen in Table 2-1 to Table 2-4. In Table 2-1 to Table 2-3, Surface1, decenter(1), 2(refl1), and bend(1) are prism related parameters, and for the meaning of other letters, embodiment 1 can be referred to, which will not be repeated in this embodiment. Furthermore, 4* to 15* in Table 2-2 sequentially represent the surface of each solid lens from the object plane to the image plane. Table 2-4 shows the eccentric setting parameters of the prism in the imaging system. As shown in FIG. 5, the deflecting reflective surface of the prism in this embodiment is set at an angle of 45 degrees relative to the optical axis, so that the optical axis changes from 0 degrees to 90 degrees. However, the deflecting setting of the reflective surface is not limited to this embodiment. The setting of the reflective surface is to meet the thickness requirements of the electronic device, and can be set to other directions and angles according to the needs of the product.

Figure 6:
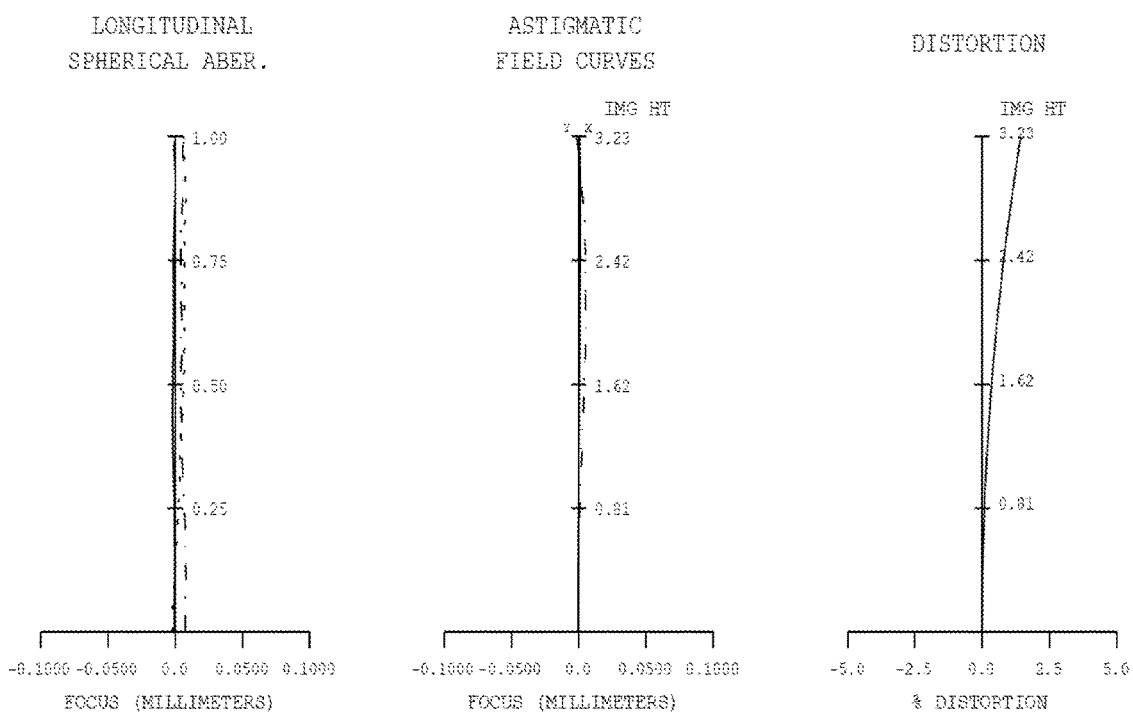
FIG. 6 is an aberration diagram according to an exemplary embodiment 2.
Figure 7:
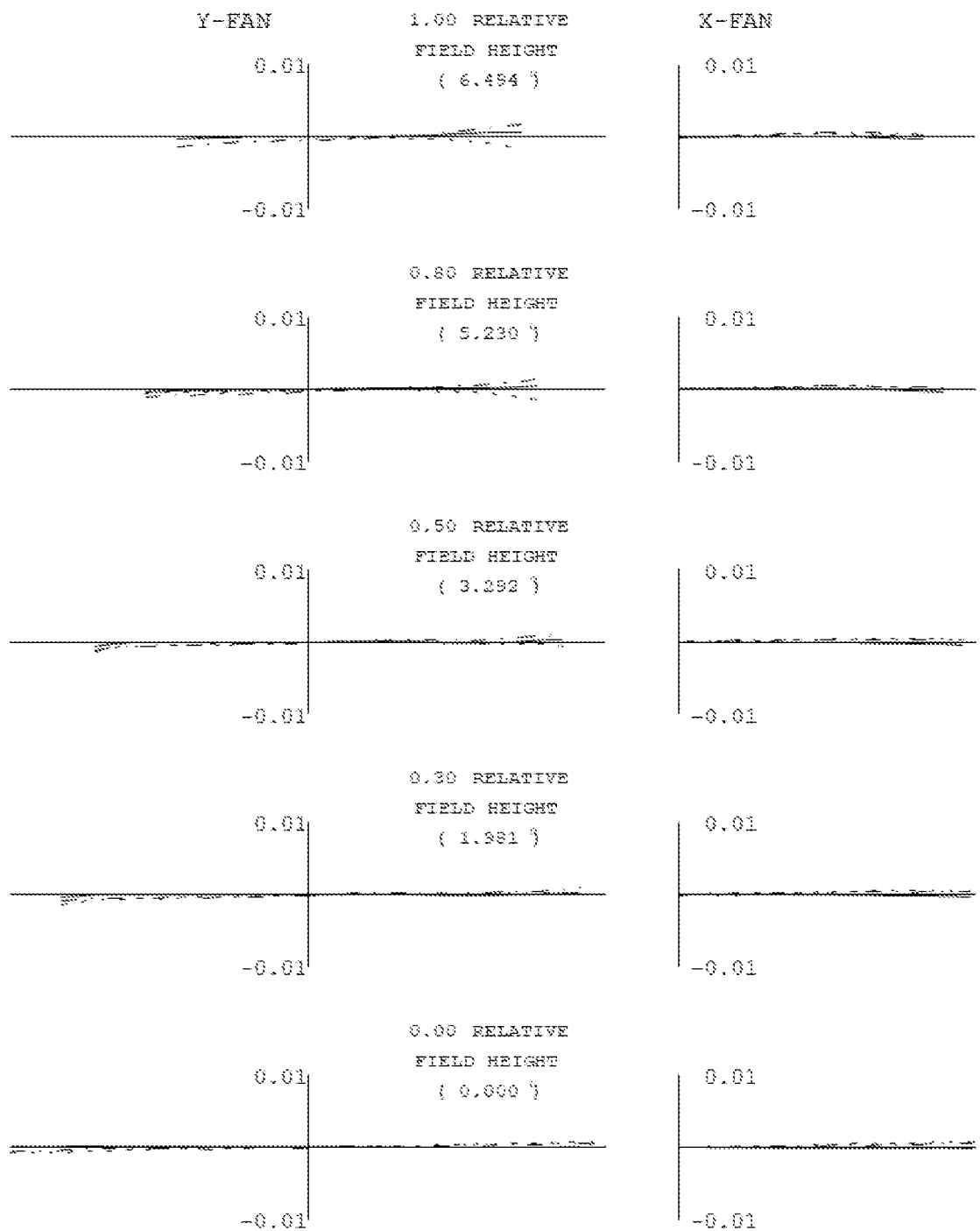
FIG. 7 is another aberration diagram according to an exemplary embodiment 2.

FIGS. 6 to 7 show aberration diagrams of the lens structure, among which, from left to right, FIG. 6 shows the spherical aberration diagram, astigmatic field curve, and distortion curve diagram of the lens structure in sequence, and FIG. 7 shows the lateral chromatic aberration or vertical chromatic aberration of the lens structure. It can be seen from FIGS. 6 and 7 that the lens structure of this embodiment has better imaging performance, and the spherical aberration, the curvature of field, and the distortion are all falling within an appropriate range.

TABLE 2-1

| S | R | thi | Nd | Vd | EFL |
|---|---|---|---|---|---|
| OBJ | | D0 | | | |
| 1 decenter(1) | INF | 3.50 | 1.52 | 64.17 | Prism |
| 2(Refl) Bend(1) | INF | −3.50 | | | |
| 3 | INF | −0.19 | | | |
| 4* | −7.847 | −1.31 | 1.54 | 56.09 | 10.30 |
| 5* | 18.333 | −0.24 | | | |
| 6* | −5.673 | −0.89 | 1.61 | 25.59 | −11.62 |
| 7* | −2.967 | −1.89 | | | |
| 8 | Rt | −0.70 | 1.29 | 108.63 | LP |
| 9 | INF | −0.28 | 1.52 | 64.20 | |
| 10 | INF | −0.50 | | | |
| STO | INF | −0.66 | | | |
| 12* | −6.174 | −1.26 | 1.54 | 55.97 | −100.45 |
| 13* | −5.149 | −0.23 | | | |
| 14* | −9.242 | −0.85 | 1.65 | 21.52 | 44.91 |
| 15* | −13.064 | −16.04 | | | |
| 16 | INF | −0.21 | 1.52 | 64.17 | |
| 17 | INF | −0.49 | | | |
| 18 | IM | | | | |

TABLE 2-2

| surface | K | A | B | C | D | E | F |
|---|---|---|---|---|---|---|---|
| 4* | 8.10763E−01 | 7.79215E−05 | −1.20080E−05 | −2.10107E−06 | 3.90678E−07 | −3.14273E−08 | 0.00000E+00 |
| 5* | 0.00000E+00 | −1.05050E−03 | 3.39464E−05 | 6.61732E−07 | −1.75903E−07 | −1.40154E−08 | 5.31898E−10 |
| 6* | −5.53890E+00 | 1.47540E−03 | 7.17152E−05 | −2.52028E−06 | −3.11120E−07 | 1.46944E−08 | 0.00000E+00 |
| 7* | −2.32790E+00 | −1.37197E−03 | 2.18353E−04 | −2.53680E−05 | 9.62969E−07 | 1.75678E−07 | −2.22108E−08 |
| 12* | 0.00000E+00 | 1.53396E−03 | −1.91168E−04 | −9.65270E−06 | −9.69713E−07 | 2.40164E−07 | −1.85872E−08 |
| 13* | 0.00000E+00 | 3.23619E−03 | −1.30140E−04 | −4.26237E−05 | 1.19861E−06 | −6.98946E−08 | 0.00000E+00 |
| 14* | 0.00000E+00 | −8.29705E−03 | 3.00823E−04 | −4.11568E−05 | 3.41510E−06 | 0.00000E+00 | 0.00000E+00 |
| 15* | 0.00000E+00 | −9.35122E−03 | 1.33526E−05 | −2.29426E−05 | 5.53195E−06 | 0.00000E+00 | 0.00000E+00 |

TABLE 2-3

| | Pos1 | Pos2 |
|---|---|---|
| D0 | INF | 50 |
| Rt | 68.64 | −11.32 |
| Fno | 4.51 | 4.51 |
| f | 28.00 | 16.86 |
| ft | −235.34 | 40.63 |

TABLE 2-4

Decenter Constants

| Decenter | X | Y | Z | Alpha (degrees) | Beta (degrees) | Gamma (degrees) |
|---|---|---|---|---|---|---|
| Decenter(1) and Bend (1) | 0 | 0 | 0 | 45 | 0 | 0 |

Embodiment 3

Figure 8:
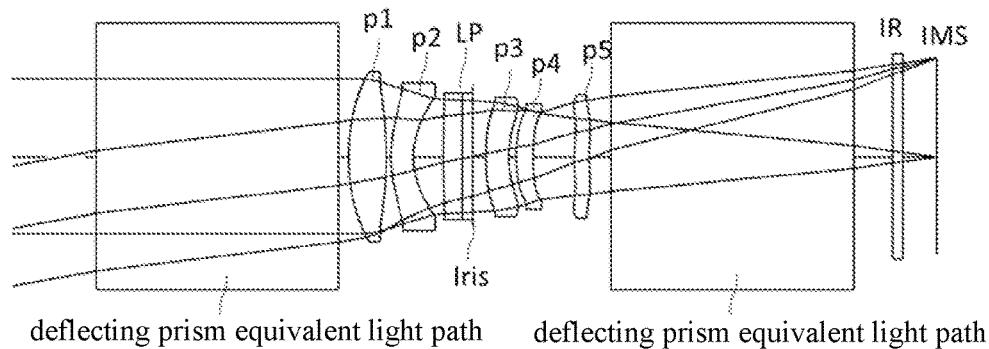
FIG. 8 is a schematic structure diagram showing a lens according to an exemplary embodiment 3.

As shown in FIG. 8, the lens structure, along the optical axis from the object plane to the image plane, sequentially includes: deflecting prism equivalent optical path 1, lens P1 in the first group of solid lenses, lens P2 in the second group of solid lenses, the tunable lens assembly (LP), aperture (Iris), lens P3, lens P4 and lens p5 in the third group of solid lenses, deflecting prism equivalent optical path 2, filter IR and sensor IMS. In the above case, there are a total of 5 solid lenses.

In an embodiment, the lens p1 with positive refractive power has a convex surface facing the object plane. The lens p2 with negative refractive power has a concave surface facing the image plane. The lens p3 has negative refractive power. Both the lens p4 and the lens p5 have positive refractive power. Specifically, each lens is formed of plastic materials with different optical characteristics, and each lens is aspherical lens.

For the lens characteristic parameters of the lens structure in this embodiment, Table 3-1 to Table 3-3 can be referred to. Surface 1-2 and 16-17 are related parameters of the prism equivalent optical path. For the meaning of other letters in Tables 3-1 to 3-3, please refer to Embodiment 1 or Embodiment 2, which will not be repeated in this embodiment. To be specific, 3* to 15* in Table 3-2 sequentially represent the surface of each solid lens from the object plane to the image plane. Table 3-4 shows the recommended eccentric setting parameters for the reflective surfaces of the two deflecting prisms. That is, the reflective surface of the first deflecting prism is set at an angle of 45 degrees relative to the current optical axis, so that the optical axis changes from the Z direction to the Y direction and changes by 90 degrees. The reflective surface of the second deflecting prism is set at an angle of −45 degrees relative to the current optical axis, so that the optical axis changes from the Y direction to the X direction and changes by 90 degrees. However, the deflecting setting of the reflective surface is not limited to the parameters in Table 3-4. The setting of the reflective surface is adapted to the size requirements of the electronic device, and can be set to other directions and angles according to the needs of the product.

Figure 9:
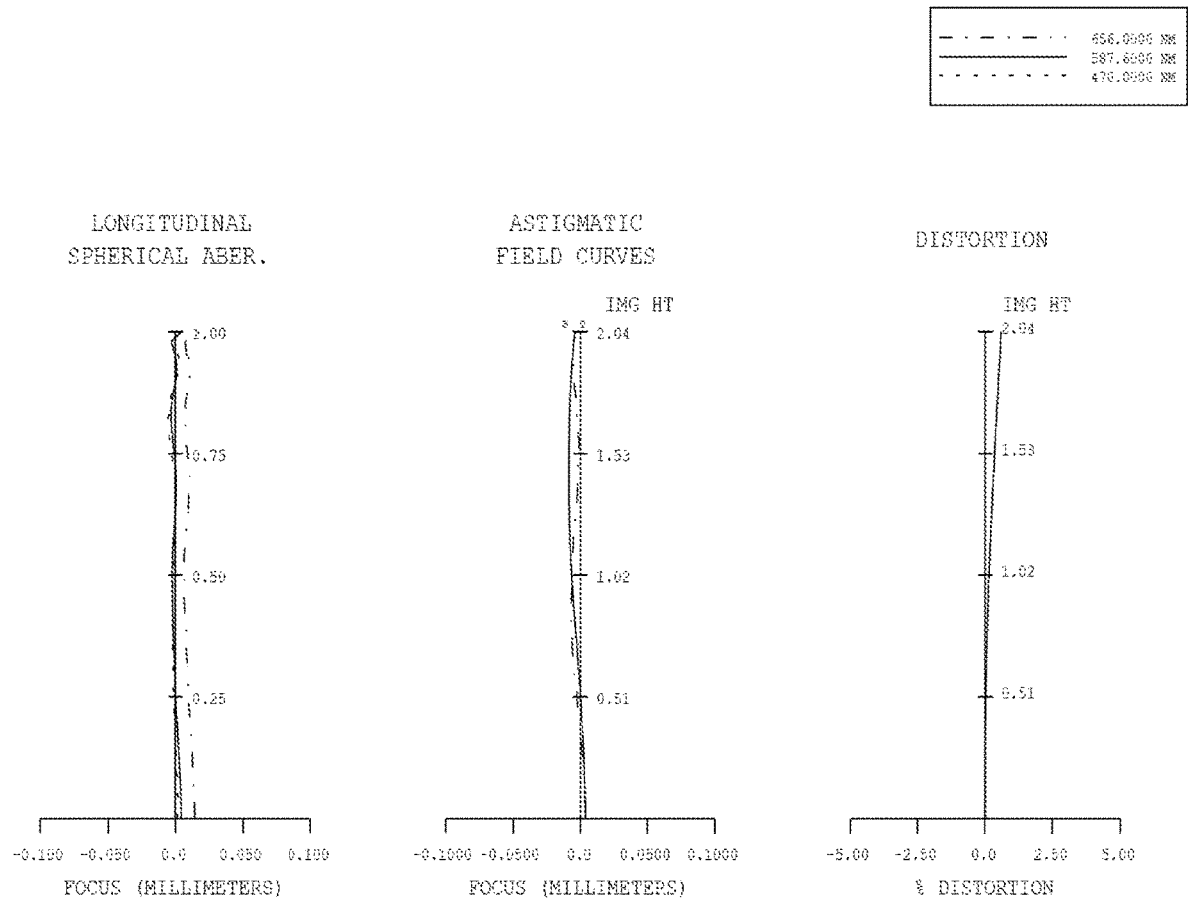
FIG. 9 is an aberration diagram according to an exemplary embodiment 3.
Figure 10:
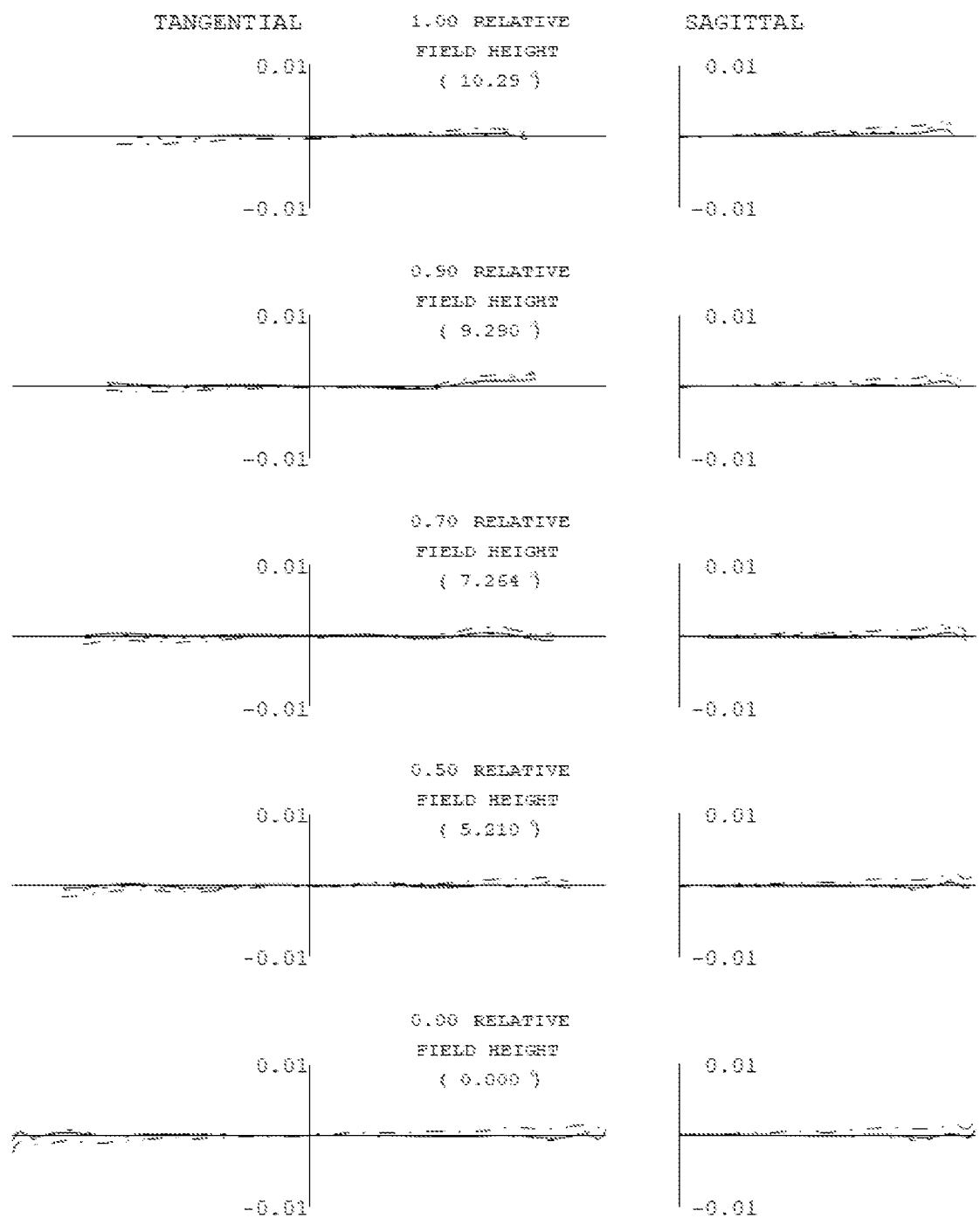
FIG. 10 is another aberration diagram according to an exemplary embodiment 3.

FIGS. 9 to 10 show aberration diagrams of the lens structure, in which, from left to right, FIG. 9 shows the spherical aberration diagram, the astigmatic field curve, and the distortion curve of the lens structure in order. FIG. 10 shows the lateral chromatic aberration or vertical chromatic aberration of the lens structure. It can be seen from FIGS. 9 and 10 that the lens structure of this embodiment has better imaging performance, and spherical aberration, curvature of field, and distortion are all falling within an appropriate range.

TABLE 3-1

| S | R | thi | Nd | Vd | EFL |
|---|---|---|---|---|---|
| OBJ |  | D0 |  |  |  |
| 1 | INF | 5.00 | 1.52 | 64.17 |  |
| 2 | INF | 0.20 |  |  |  |
| 3* | 4.192 | 0.91 | 1.544 | 56.33 | 5.15 |
| 4* | −7.840 | 0.10 |  |  |  |
| 5* | 3.235 | 0.52 | 1.633 | 23.29 | −8.22 |
| 6* | 1.870 | 0.57 |  |  |  |
| 7 | Rt | 0.40 | 1.291 | 108.63 |  |
| 8 | INF | 0.21 | 1.523 | 54.52 |  |
| STO | INF | 0.31 |  |  |  |
| 10* | 16.681 | 0.47 | 1.584 | 28.21 | −5.19 |
| 11* | 2.540 | 0.17 |  |  |  |
| 12* | 3.073 | 0.35 | 1.651 | 21.49 | 8.24 |
| 13* | 6.876 | 0.69 |  |  |  |
| 14* | 2.408 | 0.30 | 1.511 | 56.75 | 22.94 |
| 15* | 2.902 | 0.70 |  |  |  |
| 16 | INF | 5.00 | 1.517 | 64.17 |  |
| 17 | INF | 0.8 |  |  |  |
| 18 | INF | 0.21 | 1.511 | 56.75 |  |
| IM | INF | 0.69 |  |  |  |

TABLE 3-2

| surface | K | A | B | C | D | E | F |
|---|---|---|---|---|---|---|---|
| 3* | 8.95737E−01 | 1.36462E−03 | −2.54330E−04 | 1.12757E−04 | −5.75855E−05 | 2.99213E−05 | 0.00000E+00 |
| 4* | 0.00000E+00 | 1.07635E−02 | −1.82086E−03 | 1.42285E−04 | 1.70331E−04 | −9.85509E−06 | −1.88385E−06 |
| 5* | −5.51960E−01 | −2.07545E−02 | 5.41991E−03 | −2.18145E−03 | 8.51503E−04 | −2.50210E−04 | 0.00000E+00 |
| 6* | −3.08668E+00 | 2.34574E−02 | 8.13801E−03 | −4.91223E−03 | 8.87710E−03 | −6.67646E−03 | 1.18737E−03 |
| 10* | 0.00000E+00 | −2.29285E−02 | 7.95551E−02 | −1.47815E−02 | −3.97857E−02 | 2.81211E−02 | −8.02397E−03 |
| 11* | 0.00000E+00 | −9.72178E−02 | 2.48506E−02 | 1.36112E−01 | −2.01875E−01 | 6.72407E−02 | 0.00000E+00 |
| 12* | 3.92889E−01 | 6.87989E−02 | −8.66223E−02 | 1.26853E−01 | −6.20087E−02 | 8.02975E−04 | 0.00000E+00 |
| 13* | 1.83997E+01 | 9.21179E−02 | −2.18714E−02 | −8.61705E−03 | 8.95952E−02 | −3.24316E−02 | 0.00000E+00 |
| 14* | −2.02962E+00 | −1.36128E−01 | −1.35233E−02 | 1.66679E−02 | −2.28106E−02 | 4.39769E−02 | −1.51420E−02 |
| 15* | −1.93911E+01 | −4.84670E−02 | −8.56042E−02 | 7.05632E−02 | −2.59983E−02 | 6.93618E−03 | 0.00000E+00 |

TABLE 3-3

|  | Pos1 | Pos2 |
|---|---|---|
| D0 | INF | 30 |
| Rt | 100.00 | 5.29 |
| Fno | 3.50 | 3.49 |
| f | 11.17 | 7.78 |
| ft | 342.68 | 18.11 |

TABLE 3-4

Decenter Constants

| Surface | Decenter | X | Y | Z | Alpha (degrees) | Beta (degrees) | Gamma (degrees) |
|---|---|---|---|---|---|---|---|
| Prism1 | Decenter (1) and Bend (1) | 0 | 0 | 0 | 45 | 0 | 0 |
| Prism2 | Decenter (2) and Bend (2) | 0 | 0 | 0 | 0 | −45 | 0 |

Embodiment 4

Figure 11:
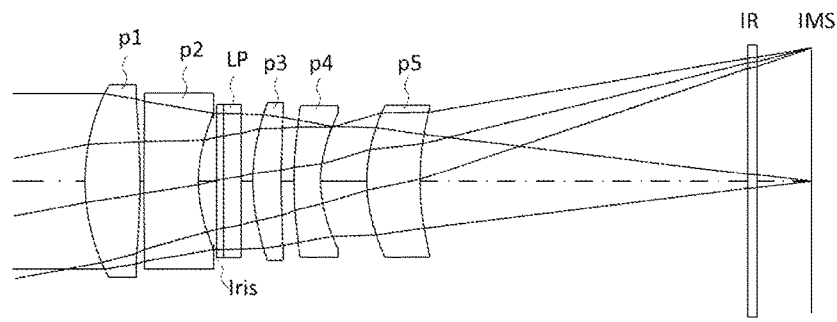
FIG. 11 is a schematic structure diagram showing a lens according to an exemplary embodiment 4.

As shown in FIG. 11, the lens structure, along the optical axis from the object plane to the image plane, comprises in order: the lens P1 in the first group of solid lenses, lens P2 in the second group of solid lenses, the aperture (Iris), the tunable lens assembly (LP), the lens P3, lens P4, and lens p5 in the third group of solid lenses, the filter IR and the image sensor IMS. To be specific, there are a total of 5 solid lenses.

In an embodiment, the lens p1 with positive refractive power has a convex surface facing the object plane. The lens p2 with negative refractive power has a concave surface facing the image plane. The lens p3 has positive refractive power, the lens p4 has negative refractive power, and the lens p5 with positive refractive power has a convex surface facing the object plane. Specifically, each lens is formed of plastic materials with different optical characteristics, and each lens is an aspheric lens.

For the parameters of the lens structure in this embodiment, Table 4-1 to Table 4-3 can be referred to. For the meaning of each letter in Table 4-1 to Table 4-3, Embodiment 1 can be referred to, which will not be repeated in this embodiment. To be specific, 1* to 14* in Table 4-2 sequentially represent the surface of each solid lens from the object plane to the image plane.

Figure 12:
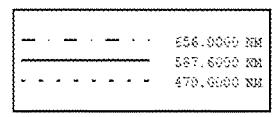
FIG. 12 is an aberration diagram according to an exemplary embodiment 4.
Figure 12:
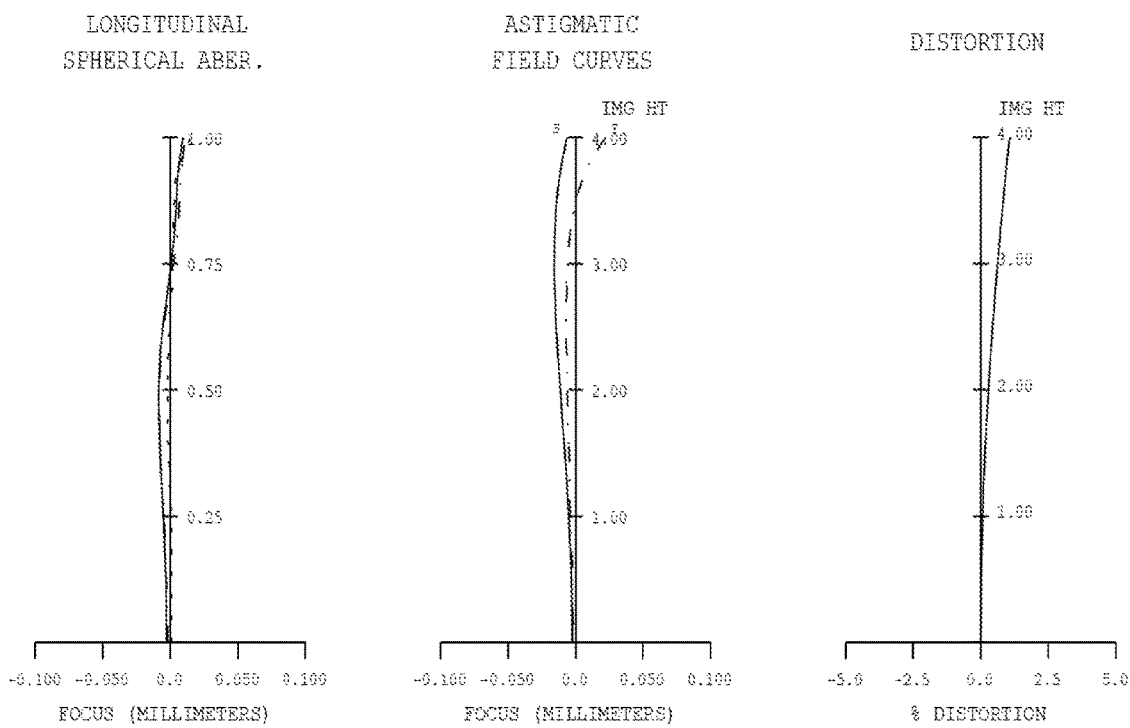
Figure 13:
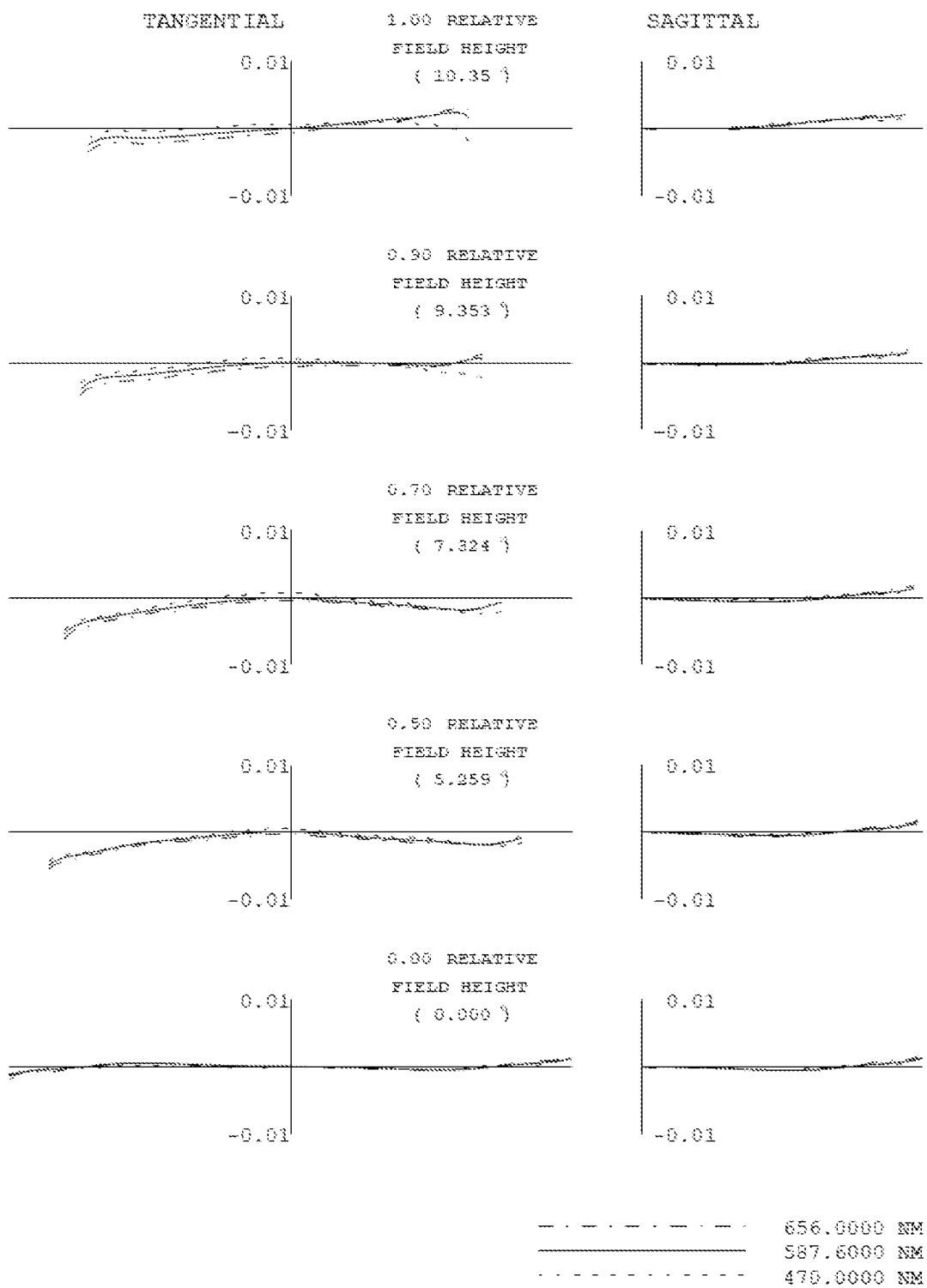
FIG. 13 is another aberration diagram according to an exemplary embodiment 4.

FIGS. 12 to 13 show aberration diagrams of the lens structure. In FIG. 12, from left to right, the spherical aberration diagram, the astigmatic field curve, and the distortion curve diagram of the lens structure are shown in sequence. FIG. 13 shows the lateral chromatic aberration or the vertical chromatic aberration of the lens structure. It can be seen from FIGS. 12 and 13 that the lens structure of this embodiment has better imaging performance, and spherical aberration, curvature of field, and distortion are all falling within an appropriate range.

TABLE 4-1

| S | R | thi | Nd | Vd | EFL |
|---|---|---|---|---|---|
| OBJ | | D0 | | | |
| 1* | 6.557 | 1.46 | 1.535 | 55.71 | 9.50 |
| 2* | −20.769 | 0.12 | | | |
| 3* | 41.917 | 1.80 | 1.614 | 25.59 | −8.12 |
| 4* | 4.383 | 0.44 | | | |
| STO | INF | 0.10 | | | |
| 6 | INF | 0.21 | 1.517 | 64.20 | |
| 7 | INF | 0.52 | 1.291 | 108.63 | |
| 8 | INF | 0.35 | | | |
| 9* | 5.691 | 0.98 | 1.671 | 19.24 | 12.13 |
| 10* | 17.621 | 0.27 | | | |
| 11* | 10.976 | 0.80 | 1.614 | 25.59 | −9.19 |
| 12* | 3.623 | 1.40 | | | |
| 13* | 4.390 | 1.60 | 1.544 | 55.97 | 15.03 |
| 14* | 8.261 | 9.85 | | | |
| 15 | INF | 0.30 | 1.517 | 64.20 | |
| IM | INF | 1.66 | | | |

TABLE 4-2

| surface | K | A | B | C | D | E |
|---|---|---|---|---|---|---|
| 1* | −6.75277E−01 | 3.44690E−04 | 2.19404E−05 | 1.25043E−06 | 2.09293E−07 | 3.34944E−08 |
| 2* | 0.00000E+00 | 7.98906E−04 | 1.82570E−05 | 2.73572E−06 | 1.52694E−07 | 3.55268E−08 |
| 3* | 0.00000E+00 | −1.86073E−03 | 1.14042E−04 | −6.78030E−06 | 1.21886E−07 | 1.43908E−08 |
| 4* | 0.00000E+00 | −4.83892E−03 | 1.35113E−04 | −1.92922E−05 | 1.86122E−06 | −8.20852E−08 |
| 9* | 0.00000E+00 | −3.42038E−03 | 2.32064E−04 | −9.98665E−06 | 2.24238E−06 | −9.37004E−08 |
| 10* | 0.00000E+00 | −3.66058E−03 | 4.77315E−04 | −1.67743E−05 | 1.51014E−06 | 1.30469E−06 |
| 11* | 0.00000E+00 | −2.80866E−03 | 6.27418E−05 | 8.51408E−05 | −4.09113E−06 | 2.24035E−06 |
| 12* | 0.00000E+00 | −7.78649E−03 | 3.89881E−05 | 9.94518E−05 | 3.64356E−06 | 1.76847E−06 |
| 13* | 0.00000E+00 | −4.72643E−03 | −8.93882E−05 | 1.27349E−05 | 6.40466E−06 | −3.62788E−08 |
| 14* | 0.00000E+00 | −8.04973E−04 | −1.61115E−04 | 4.99521E−06 | 4.41257E−06 | 1.34003E−07 |

TABLE 4-3

| | Pos1 | Pos2 |
|---|---|---|
| D0 | INF | 328 |
| Rt | INF | −58.91 |
| Fno | 4.10 | 3.77 |
| f | 21.67 | 19.92 |
| ft | INF | 201.89 |

Embodiment 5

Figure 14:
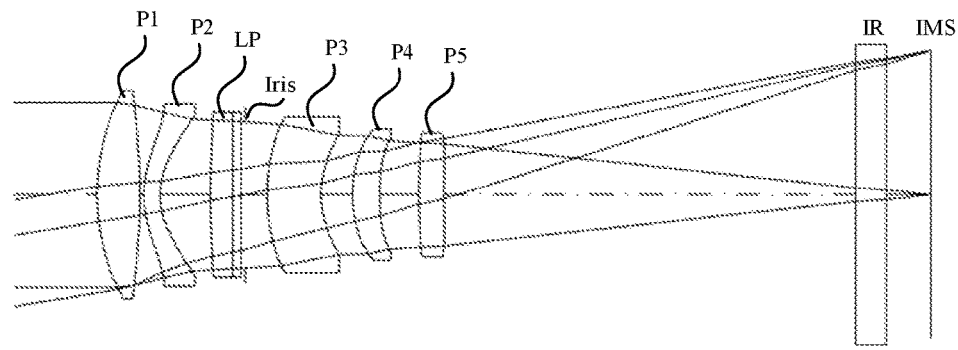
FIG. 14 is a schematic structure diagram showing a lens according to an exemplary embodiment 5.

As shown in FIG. 14, the lens structure, along the optical axis from the object plane to the image plane, includes in order: lens P1 in the first group of solid lenses, lens P2 in the second group of solid lenses, tunable lens assembly (LP), aperture (Iris), lens P3, lens P4, and lens p5 in the third group of solid lenses, the filter IR and the image sensor IMS. To be specific, there are a total of 5 solid lenses.

In an embodiment, the lens p1 with positive refractive power has a convex surface facing the object plane, the lens p2 with negative refractive power has a concave surface facing the image plane, the lens p3 with negative refractive power has a concave surface facing the image surface, the lens p4 is positive refractive power, and the lens p5 with positive refractive power has a convex surface facing the object plane. To be specific, each lens is formed of plastic materials with different optical characteristics, and each lens is aspherical lens.

For the parameters of the lens structure in this embodiment, Table 5-1 to Table 5-3 can be referred to. For the meaning of each letter in Table 5-1 to Table 5-3, please refer to Embodiment 1, which will not be repeated in this embodiment. To be specific, 1* to 14* in Table 5-2 sequentially represent the surface of each solid lens from the object plane to the image plane.

Figure 15:
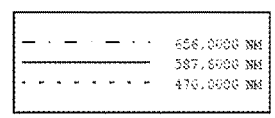
FIG. 15 is an aberration diagram according to an exemplary embodiment 5.
Figure 15:
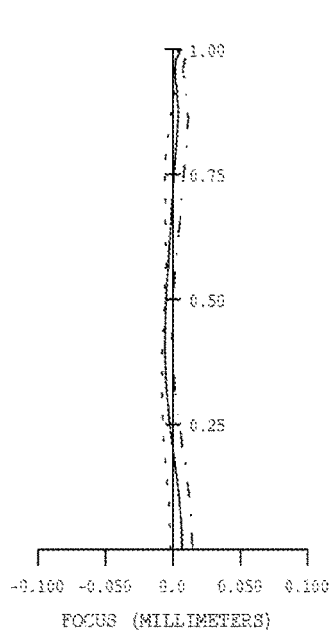
Figure 15:
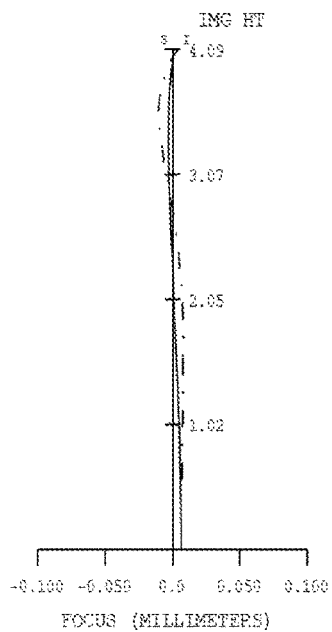
Figure 15:
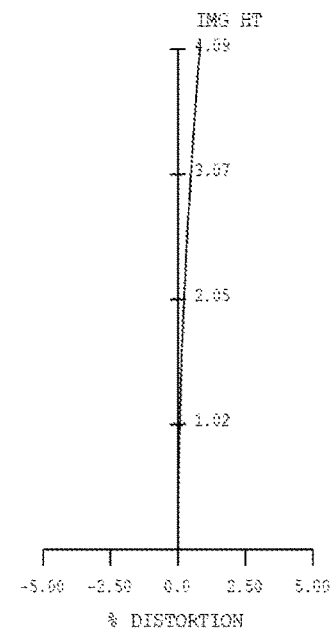
Figure 16:
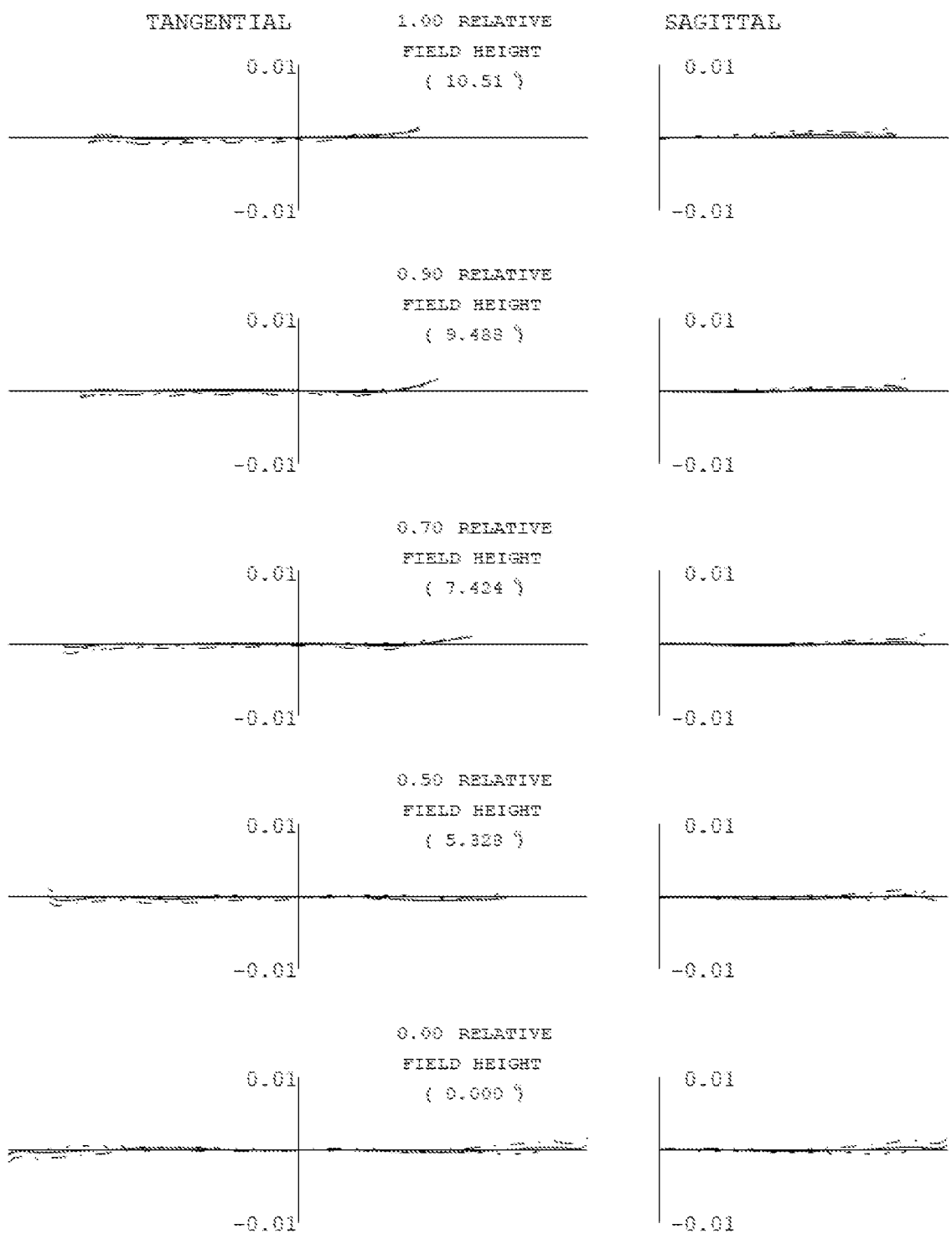
FIG. 16 is another aberration diagram according to an exemplary embodiment 5.

FIGS. 15 to 16 show aberration diagrams of the lens structure. From left to right, FIG. 15 shows the spherical aberration diagram, astigmatic field curve, and distortion curve diagram of the lens structure in order. FIG. 16 shows the lateral chromatic aberration or vertical chromatic aberration of the lens structure. It can be seen from FIG. 15 and FIG. 16 that the lens structure of this embodiment has better imaging performance, and the spherical aberration, curvature of field, and distortion are all falling within an appropriate range.

TABLE 5-1

| S | R | thi | Nd | Vd | EFL |
|---|---|---|---|---|---|
| OBJ | | D0 | | | |
| 1* | 6.996 | 1.10 | 1.544 | 56.09 | 9.33 |
| 2* | −17.422 | 0.10 | | | |

TABLE 5-1-continued

| S | R | thi | Nd | Vd | EFL |
|---|---|---|---|---|---|
| 3* | 3.479 | 0.41 | 1.614 | 25.59 | −14.16 |
| 4* | 2.374 | 1.26 | | | |
| 5 | 35.929 | 0.55 | 1.291 | 108.63 | |
| 6 | INF | 0.22 | 1.517 | 64.20 | |
| 7 | INF | 0.10 | | | |
| STO | INF | 0.55 | | | |

TABLE 5-1-continued

| S | R | thi | Nd | Vd | EFL |
|---|---|---|---|---|---|
| 9* | 6.942 | 1.36 | 1.635 | 23.97 | −10.26 |
| 10* | 3.105 | 0.79 | | | |
| 11* | 4.703 | 0.67 | 1.671 | 19.24 | 15.10 |
| 12* | 8.276 | 1.00 | | | |
| 13* | 10.985 | 0.63 | 1.492 | 57.46 | 53.42 |
| 14* | 18.523 | 10.38 | | | |
| 15 | INF | 0.77 | 1.517 | 64.17 | |
| IM | INF | 1.11 | | | |

TABLE 5-2

| surface | K | A | B | C | D | E |
|---|---|---|---|---|---|---|
| 1* | 7.04821E−01 | −2.83236E−04 | 9.96878E−05 | 1.71963E−06 | −2.77038E−06 | 1.93369E−07 |
| 2* | 0.00000E+00 | 2.03541E−03 | −1.05508E−04 | −1.58581E−05 | 9.42127E−07 | 1.23735E−07 |
| 3* | −2.90300E+00 | −4.51747E−03 | −2.64157E−04 | −1.33843E−05 | 4.87961E−06 | −7.51755E−08 |
| 4* | −2.13657E+00 | 4.76514E−04 | −6.79527E−04 | 1.12679E−04 | 1.83593E−06 | −3.50580E−06 |
| 9* | 6.60159E−01 | 1.68089E−04 | 6.89611E−04 | 1.96762E−04 | −8.16919E−05 | 1.04300E−05 |
| 10* | −2.72760E−01 | −9.98043E−03 | 1.44073E−03 | 6.49149E−04 | −3.51679E−04 | 4.45229E−05 |
| 11* | −6.74528E+00 | 1.49589E−02 | 2.32953E−04 | 5.83110E−04 | −1.70126E−04 | 1.18984E−05 |
| 12* | 6.13987E+00 | 1.09984E−02 | 2.08118E−03 | 3.72530E−04 | 1.87495E−06 | 5.94993E−07 |
| 13* | 2.63997E+01 | −1.58748E−02 | 7.96641E−04 | 1.26098E−04 | −4.00130E−05 | 4.14615E−05 |
| 14* | 8.25113E+01 | −1.53712E−02 | 4.20286E−04 | −4.52950E−05 | 2.21077E−05 | 1.90672E−06 |

TABLE 5-3

| | Pos1 | Pos2 |
|---|---|---|
| D0 | INF | 329 |
| Rt | 35.93 | 23.03 |
| Fno | 4.10 | 3.76 |
| f | 21.91 | 20.19 |
| ft | 123.41 | 79.09 |

Embodiment 6

Figure 17:
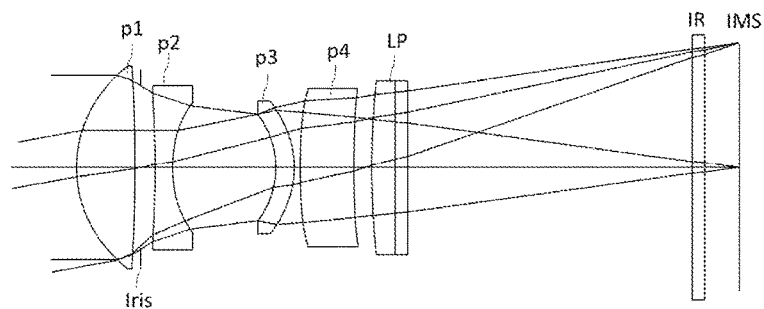
FIG. 17 is a schematic structure diagram showing a lens according to an exemplary embodiment 6.

As shown in FIG. 17, the lens structure, along the optical axis from the object plane to the image plane, comprises in order: lens P1 in the first group of solid lenses, aperture (Iris), lens P2 in the second group of solid lenses, lens P3 and lens P4 in the third group of solid lenses, tunable lens assembly (LP), filter IR and image sensor IMS. Specifically, there are a total of 4 solid lenses.

In an embodiment, the lens p1 with positive refractive power has a convex surface facing the object plane, the lens p2 with negative refractive power has a concave surface facing the image plane, the lens p3 with negative refractive power has a concave surface facing the object plane, and the lens p4 is positive refractive power. Specifically, each lens is formed of plastic materials with different optical characteristics, and each lens is aspherical lens.

For the parameters of the lens structure in this embodiment, Table 6-1 to Table 6-3 can be referred to. For the meaning of each letter in Table 6-1 to Table 6-3, Embodiment 1 can be referred to, which will not be repeated in this embodiment. To be specific, 1* to 9* in Table 6-2 sequentially represent the surface of each lens from the object plane to the image plane.

Figure 18:
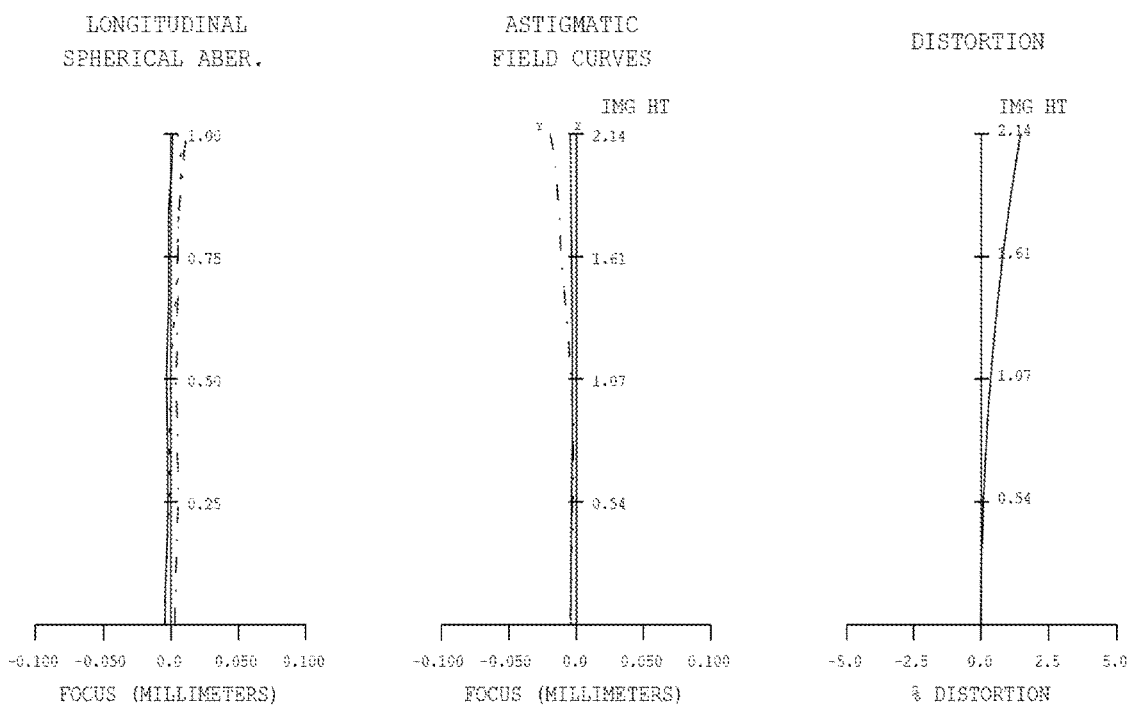
FIG. 18 is an aberration diagram according to an exemplary embodiment 6.
Figure 19:
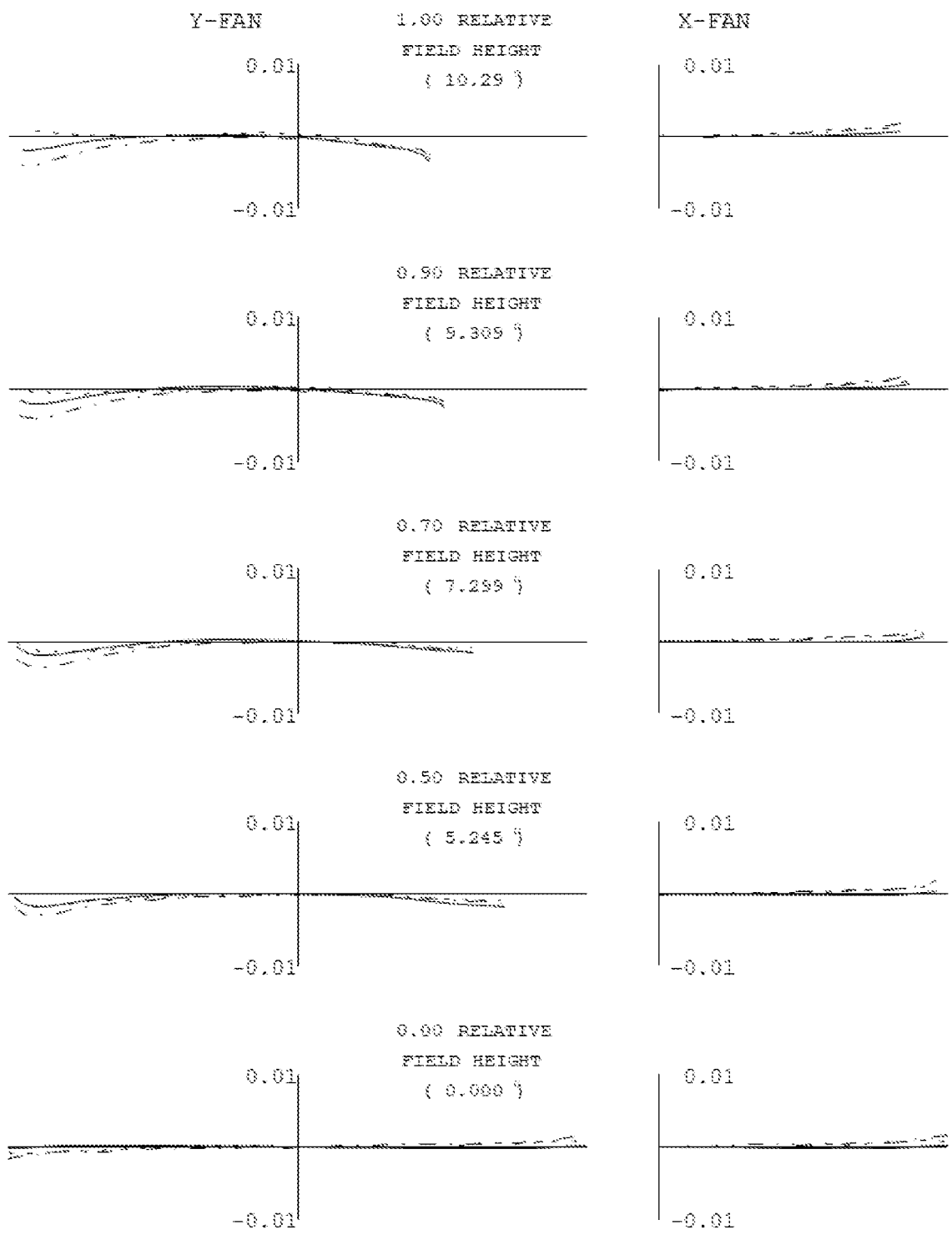
FIG. 19 is another aberration diagram according to an exemplary embodiment 6.

FIGS. 18 to 19 show aberration diagrams of the lens structure. In FIG. 18, from left to right, the spherical aberration diagram, astigmatic field curve, and distortion curve diagram of the lens structure are shown in sequence. FIG. 19 shows the lateral chromatic aberration or vertical chromatic aberration of the lens structure. It can be seen from FIG. 18 and FIG. 19 that the lens structure of this embodiment has better imaging performance, and the spherical aberration, curvature of field, and distortion are all falling within an appropriate range.

TABLE 6-1

| S | R | thi | Nd | Vd | EFL |
|---|---|---|---|---|---|
| OBJ | | D0 | | | |
| 1* | 2.129 | 1.00 | 1.54 | 56.33 | 3.74 |
| 2* | −38.194 | 0.10 | | | |
| STO | INF | 0.24 | | | |
| 4* | −22.790 | 0.30 | 1.58 | 30.11 | −3.62 |
| 5* | 2.327 | 1.76 | | | |
| 6* | −1.452 | 0.32 | 1.67 | 19.44 | −73.60 |
| 7* | −1.626 | 0.10 | | | |
| 8* | 11.847 | 0.92 | 1.59 | 28.30 | 41.90 |
| 9* | 22.266 | 0.30 | | | |
| 10 | Rt | 0.40 | 1.29 | 108.63 | |
| 11 | INF | 0.21 | 1.52 | 64.20 | |
| 12 | INF | 4.86 | | | |
| 13 | INF | 0.21 | 1.517 | 64.17 | |
| 14 | INF | 0.59 | | | |

TABLE 6-2

| surface | K | A | B | C | D | E | F |
|---|---|---|---|---|---|---|---|
| 1* | 3.14748E−02 | 3.24673E−04 | 5.10831E−06 | −2.71698E−04 | 1.42572E−04 | −6.18864E−05 | 0.00000E+00 |
| 2* | 0.00000E+00 | −3.10567E−03 | 3.49642E−04 | 1.24042E−04 | −1.73238E−04 | 8.41530E−05 | −1.21324E−05 |
| 4* | 0.00000E+00 | −3.54205E−03 | −8.46001E−04 | 6.92389E−04 | 9.82883E−04 | −2.31367E−04 | −1.65219E−05 |
| 5* | −1.19407E+00 | 3.66468E−02 | 4.23042E−03 | 3.07291E−03 | 2.35740E−03 | −9.54477E−05 | 0.000734213 |

TABLE 6-2-continued

| surface | K | A | B | C | D | E | F |
|---|---|---|---|---|---|---|---|
| 6* | 0.00000E+00 | 2.25342E-02 | -6.11812E-03 | 1.08839E-02 | -1.86801E-03 | 0.00000E+00 | 0.00000E+00 |
| 7* | 0.00000E+00 | 1.55531E-02 | 7.59316E-03 | 0.00000E+00 | 0.00000E+00 | 0.00000E+00 | 0.00000E+00 |
| 8* | 0.00000E+00 | 2.16587E-03 | 1.60204E-02 | -5.64925E-03 | -3.33874E-04 | 5.29187E-04 | -3.66005E-05 |
| 9* | 0.00000E+00 | 1.41218E-03 | 3.06028E-03 | 3.00795E-03 | -2.14402E-03 | 4.48303E-04 | 0.00000E+00 |

TABLE 6-3

| | Pos1 | Pos2 |
|---|---|---|
| D0 | INF | 150 |
| Rt | 15.00 | 6.89 |
| Fno | 3.68 | 3.58 |
| f | 11.61 | 10.20 |
| ft | 51.43 | 23.61 |

The formula parameters corresponding to the above six embodiments are shown in Table 7.

TABLE 7

| | | exp1 | exp2 | exp3 | exp4 | exp5 | exp6 |
|---|---|---|---|---|---|---|---|
| | f/ft_pos1 | 0.00 | -0.12 | 0.03 | 0.00 | 0.18 | 0.23 |
| | f/ft_pos2 | 0.12 | 0.69 | 0.62 | 0.11 | 0.28 | 0.51 |
| formula 1 | \|delta(f/ft)\| | 0.12 | 0.81 | 0.58 | 0.11 | 0.10 | 0.29 |
| | FOV_pos1(degrees) | 21.40 | 12.99 | 20.58 | 20.70 | 21.01 | 20.58 |
| | FOV_pos2(degrees) | 21.57 | 12.47 | 20.05 | 20.77 | 20.94 | 21.89 |
| formula 2 | \|Delta(FOV)\| (degrees) | 0.17 | 0.51 | 0.53 | 0.07 | 0.07 | 1.31 |
| | f1 | 17.28 | 10.25 | 5.13 | 9.46 | 9.29 | 3.74 |
| | f2 | -30.17 | -11.51 | -8.15 | -8.04 | -14.04 | -3.62 |
| | f3 | 52.47 | 92.89 | -35.27 | 21.17 | -63.77 | 82.92 |
| formula 3 | \|f2/f1\| | 1.75 | 1.12 | 1.59 | 0.85 | 1.51 | 0.97 |
| formula 4 | \|f/f3\| | 0.40 | 0.30 | 0.32 | 1.02 | 0.34 | 0.14 |
| formula 5 | TTL/f | 0.98 | 0.92 | 1.11 | 1.01 | 0.96 | 0.97 |
| formula 6 | (R1 + R2)/(R1 - R2) | -0.35 | -0.40 | -0.30 | -0.52 | -0.43 | -0.89 |
| | CRA(deg) | 13.03 | 9.84 | 15.3 | 13.90 | 14.28 | 12.1 |
| | \|DIST\| | 0.5% | 1.4% | 0.60% | 1.1% | 0.8% | 1.52% |
| formula 7 | d/TTL | 0.03 | 0.02 | 0.03 | 0.00 | 0.00 | 0.35 |

In an exemplary embodiment, the present disclosure also proposes a camera module, including a photosensitive chip, a driving mechanism, and the telephoto imaging system according to any one of the above embodiments, wherein the driving mechanism is used to change the curvature of the tunable lens assembly.

Further, in conjunction with the telephoto imaging system shown in FIG. 1, the position of the photosensitive chip may be, for example, at the imaging plane. The light rays sequentially pass through the first group of solid lenses 11, the second group of solid lenses 12, the aperture 2, the tunable lens group 14, and the third group of solid lenses 13. After convergence and divergence by the respective lenses, the light rays reach the photosensitive chip. The photosensitive chip converts the optical signal into an electrical signal to achieve photoelectric conversion.

The camera module may also include an image processor, or the photosensitive chip of the camera module may be connected to the image processor of the electronic device. The image processor is used to process electrical signals to realize electronic imaging. The photosensitive chip or image processor of the camera module can communicate with the processor of the electronic device. The control signal for controlling the driving mechanism can be sent by the image processor or the processor of the electronic device.

The driving mechanism may include, for example, a driving motor, or other forms of driving source.

In one example, the drive mechanism includes a drive motor. The driving motor is drivingly connected to the tunable lens assembly 14. By changing the voltage or current output to the drive motor, the processor of the electronic device controls the pressure applied to the tunable lens assembly 14 by the drive motor, thereby changing the curvature of the tunable lens assembly 14. The focal length is changed by changing the surface curvature of the tunable lens assembly 14, thereby achieving focusing.

In another example, the driving mechanism includes a driving source. Metal coils and magnets can be arranged on the outer circumference of the tunable lens assembly 14. The processor of the electronic device changes the control signal output to the driving supply, and controls the driving supply to change the driving voltage or current applied to the tunable lens assembly 14. Thus, changes occur in the driving voltage or current loaded on the tunable lens assembly 14, the current of the metal coil changes too, and the magnet generates a magnetic force on the metal coil, so that the metal coil squeezes the tunable lens assembly 14, thereby changing the curvature of the tunable lens assembly 14, and changing the focal length.

In an embodiment, the camera module can also be matched with a driving mechanism, so as to realize the optical image stabilization (OIS) function.

In an exemplary embodiment, the present disclosure also proposes an electronic device. The electronic device may be, for example, a mobile phone, a notebook computer, a tablet computer, a smart watch, a digital camera, a monitoring device, an aerial camera, a traditional SLR mirrorless camera, and other electronic devices with camera function.

To be specific, the electronic device includes a processor and the camera module involved in the above embodiments. The processor is electrically connected to the driving mechanism, and is used to send control signals to control the operation of the driving mechanism. The processor can also interactively process the feedback signals of the camera module and the driving mechanism.

The various device components, units, circuits, blocks, or portions may have modular configurations, or are composed of discrete components, but nonetheless may be referred to as "modules," "components" or "circuits" in general. In other words, the components, units, circuits, blocks, or portions referred to herein may or may not be in modular forms.

The various device components, units, blocks, portions, or modules may be realized with hardware, software, or a combination of hardware and software.

In some embodiments of the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms In some embodiments of the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In some embodiments of the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or retracted from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

What is claimed is:

1. A telephoto imaging system, comprising: a solid lens assembly and a tunable lens assembly, wherein
    the solid lens assembly comprises a first group of solid lenses, a second group of solid lenses, and a third group of solid lenses arranged in order along an optical axis from an object plane to an image plane;
    the tunable lens assembly is configured for changing its focal length under the effect of a driving mechanism, so as to focus for the telephoto imaging system; and the tunable lens assembly satisfies the following condition when at least an in-focus state exists during the focusing process:

$0.29 < |\text{delta}(f/ft)| < 0.9$, wherein, f represents the focal length of the telephoto imaging system in the in-focus state, ft represents a focal length of the tunable lens assembly in the in-focus state during the focusing process, and delta (f/ft) represents a difference between ratio of f/ft in the in-focus state and ratio of f/ft when an infinity is in focus, wherein when a lens closest to the object plane in the first group of solid lenses is referred to as a first lens, the focal length f of the telephoto imaging system is measured in the in-focus state with respect to the infinity, and a distance TTL is defined between a vertex on a surface proximal to an object plane of the first lens and an imaging plane along the optical axis, the distance TTL satisfies:

$0.8 < TTL/f < 1.2$, wherein on the imaging plane, an angle CRA is formed between a central incident light corresponding to the highest imaging point and the normal line of the imaging plane, wherein CRA<30°, and the highest imaging point indicates an imaging point with the largest height on the imaging plane, and wherein an outer circumference of the tunable lens assembly is provided with metal coils and magnets, the metal coils and the magnets being configured to cause a curvature of the tunable lens assembly to change as a driving voltage or current applied by the driving mechanism on the tunable lens assembly changes.

2. The telephoto imaging system according to claim 1, wherein the first group of solid lenses has positive refractive power, the second group of solid lenses has negative refractive power, the first group of solid lenses comprises at least one lens with a positive focal length, and the second group of solid lenses comprises at least one lens with a negative focal length, wherein a distance between a lens close to the image plane in the first group of solid lenses and a lens close to the object plane in the second group of solid lenses is the largest distance between any lenses in the first and second group of solid lenses.

3. The telephoto imaging system according to claim 1, wherein the maximum value of a Field of View (FOV) change of the telephoto imaging system during the focusing process satisfies the following condition:

$|\text{Delta}(FOV)| < 1.5°$.

4. The telephoto imaging system according to claim 1, wherein a focal length f1 of the first group of solid lenses and a focal length f2 of the second group of solid lenses satisfy the following condition:

$0.3 < |f2/f1| < 2.0$.

5. The telephoto imaging system according to claim 1, wherein the focal length f of the telephoto imaging system when the infinity is in focus and a focal length f3 of the third group of solid lenses satisfy the following condition:

$0 < |f/f3| < 1.5$.

6. The telephoto imaging system according to claim 1, wherein a first lens closest to the object plane in the first group of solid lenses is a positive lens, a surface of the first lens facing the object plane is a convex surface, a radius of curvature of the surface of the first lens facing the object plane is R1, a radius of curvature of a surface of the first lens facing the image plane is R2, and the following condition is satisfied between the two radius of curvature R1, R2:

$-1.5 < (R1+R2)/(R1-R2) < 0$.

7. The telephoto imaging system according to claim 1, wherein a surface facing the image plane of a negative lens in the second group of solid lenses is concave and aspheric.

8. The telephoto imaging system according to claim 1, wherein on an imaging plane, an optical distortion value DIST at the highest imaging point satisfies the following condition:

$|DIST| < 5\%$.

9. The telephoto imaging system according to claim 1, wherein the Abbe number or dispersion coefficient of a material used for at least one lens with positive refractivee power is larger than 50, and the Abbe number or dispersion coefficient of a material used for at least one lens with negative refractive power is less than 30.

10. The telephoto imaging system according to claim 1, wherein at least one lens in the first group of solid lenses and the second group of solid lenses is a plastic lens, and a refractive index of the plastic lens is less than 1.7.

11. The telephoto imaging system according to claim 1, wherein
the tunable lens assembly is arranged between the first group of solid lenses and the image plane along the optical axis; or
the tunable lens assembly is arranged between the first group of solid lenses and the object plane along the optical axis.

12. A lens, comprising:
an aperture; and
the telephoto imaging system of claim 1.

13. The lens according to claim 12, further comprising:
a deflecting prism, wherein
the deflecting prism is arranged on a object plane of the first group of solid lenses, or arranged between the third group of solid lenses and the image plane.

14. A camera module, comprising:
a photosensitive chip,
a driving mechanism; and
the telephoto imaging system of claim 1.

15. A mobile phone comprising the camera module of claim 14, further comprising a display screen.

16. The mobile phone of claim 15, wherein the telephoto imaging system is configured to change the focal length of the tunable lens assembly to achieve focusing without moving the solid lens assembly.

17. The mobile phone of claim 16, wherein the mobile phone is configured to reserve no moving space in the telephoto imaging system, thereby facilitating miniaturization of the mobile phone.

18. The mobile phone of claim 17, wherein on the optical axis, the tunable lens assembly is disposed between the groups of solid lenses, thereby ensuring a focus range while reducing sensitivity, and the focal length change of the tunable lens assembly meeting needs for different focusing distance ranges.

* * * * *